United States Patent
Erikson

[15] 3,661,050
[45] May 9, 1972

[54] MACHINE TOOL HAVING WORK FEED MEANS

[72] Inventor: Carl F. Erikson, Belvidere, Ill.
[73] Assignee: Sundstrand Corporation
[22] Filed: July 15, 1969
[21] Appl. No.: 841,772

[52] U.S. Cl.................................90/21 B, 90/11 R, 90/11 A, 90/15 A, 90/21 D, 90/56, 29/26, 29/565
[51] Int. Cl.........................................B23c 9/00, B23q 41/00
[58] Field of Search..................90/21, 15, 20, 21.5, 15.1, 90/11, 163, 21.02, 21.12, 21.1, DIG. 16; 51/95 R, 95 WH, 122, 123, 231, 232, 92 R, 238 S, 238 CG; 82/2.5, 2.7, 38, 39; 29/560

[56] References Cited

UNITED STATES PATENTS

| | | | |
|---|---|---|---|
| 1,571,331 | 2/1926 | Hagman | 82/2.5 X |
| 1,622,822 | 3/1927 | Cockburn | 82/39 |
| 2,748,665 | 6/1956 | Senn | 90/21.1 |
| 3,109,319 | 11/1963 | Pierce | 90/21 X |
| 3,117,492 | 1/1964 | Muller | 90/11 |
| 3,286,324 | 11/1966 | Hautau | 90/15 X |

*Primary Examiner*—Gil Weidenfeld
*Attorney*—Hofgren, Wegner, Allen, Stellman & McCord

[57] ABSTRACT

A machine tool for machining successive parts from bar stock extending lengthwise along a work axis having a tool spindle for carrying a tool with means mounting the spindle for movement along a first axis extending toward the work axis and a second axis at an angle to the first axis with the plane defined by the first and second axes being at an angle to the work axis, a work holder through which the bar stock extends along the work axis and which grips the bar stock during machining with means for moving the work holder and bar stock along the work axis during machining with a portion of the bar stock length exposed for machining. Mechanism associated with the work holder provides for regripping and location of the bar stock and for either indexable positioning of the bar stock about the work axis or rotation thereof. The bar stock can additionally be supported by a second work holder unit movable with the first work holder and movable relative thereto for varying the distance therebetween or, alternatively, by a steady rest unit which can grip the bar stock at either side of a machining location and provide support for the part of the bar stock at the side of the tool remote from the work holder by connection to the length of bar stock adjacent the work holder. Additionally, a third work holder can be used for additional support and positioning movement of the bar stock relative to the other two work holders. A variety of tools can be used in machining, as provided by a multispindle head or by a single spindle head in association with a tool changer. The tool changer holds a series of tools with their axes disposed radially of the axis of rotation of the tool changer and with insertion and withdrawal of a tool from the magazine being accomplished by movement of the magazine tool gripper in a direction transverse to the length of the tool.

Each of the work holders has gripping jaws for the bar stock which are shaped to firmly engage the bar stock and hold it in position relative to the work holder. The drives for indexing the work holder and indexing of the tool changer are controlled by a numerical control system which selects a desired position of the work holder or tool changer, with provisions for acceleration and deceleration of the drive. The tool spindle is positively locked in position to associate a key with a keyway in the tool or an adapter associated with the tool and the mechanism for locking the spindle provides for two distinct rotatively separated locking positions for the spindle.

16 Claims, 33 Drawing Figures

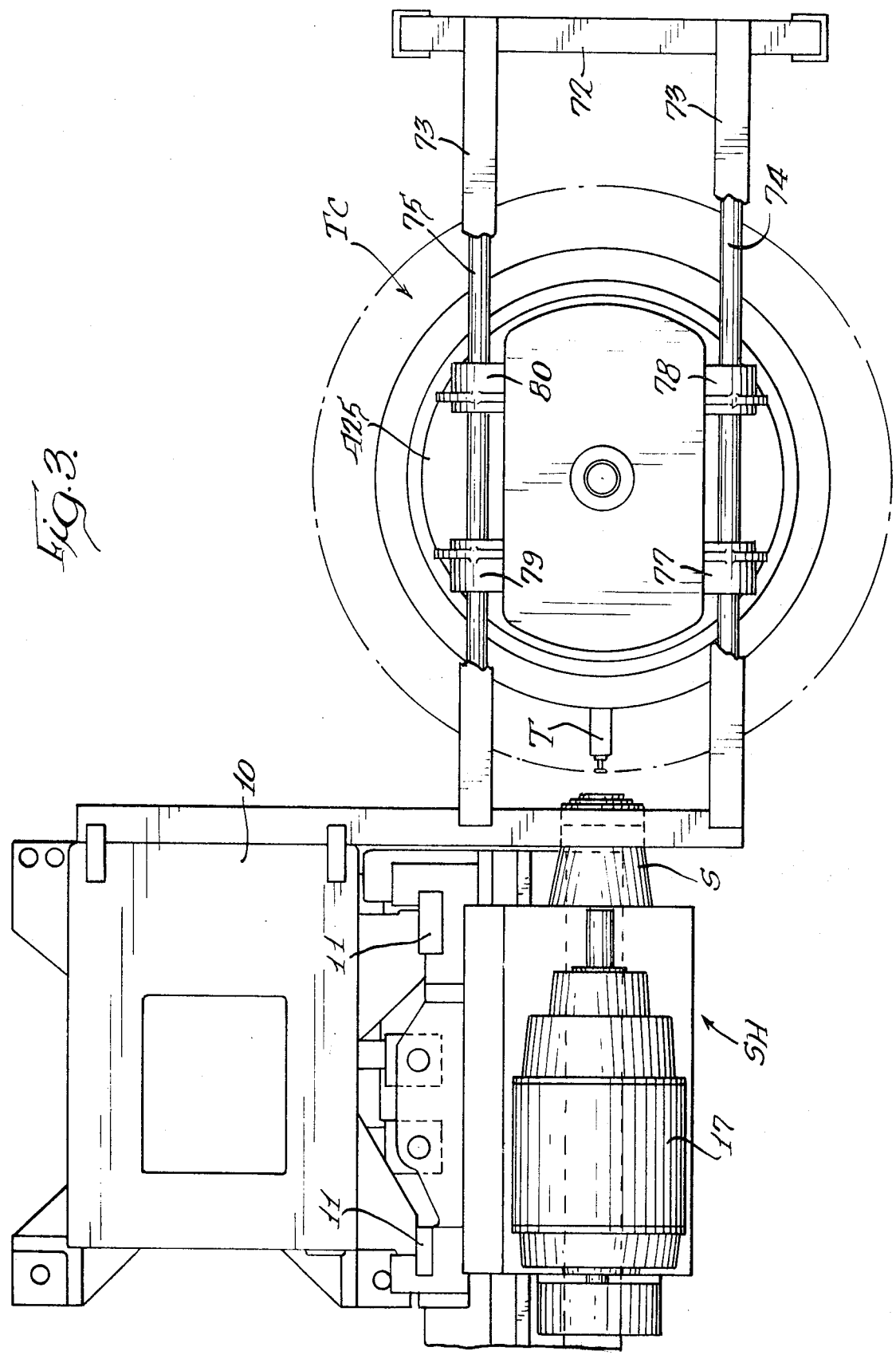

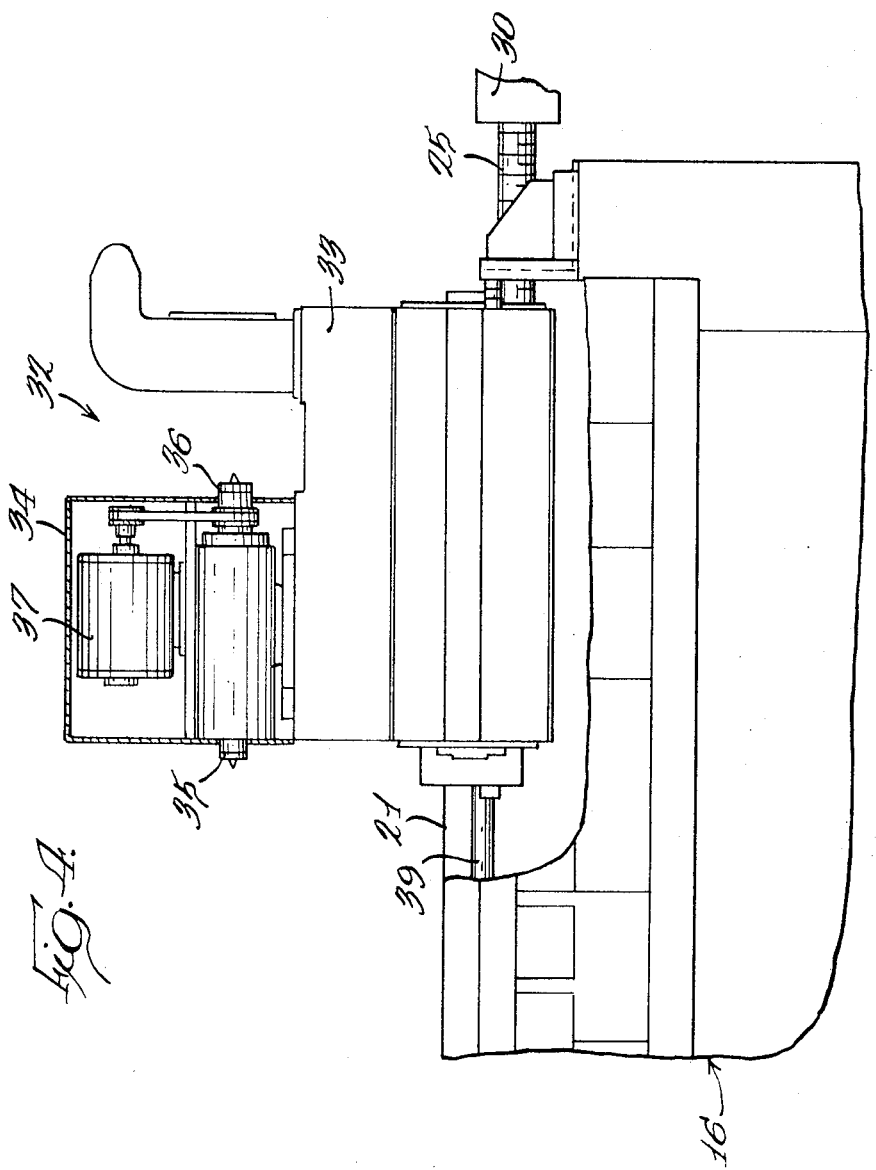

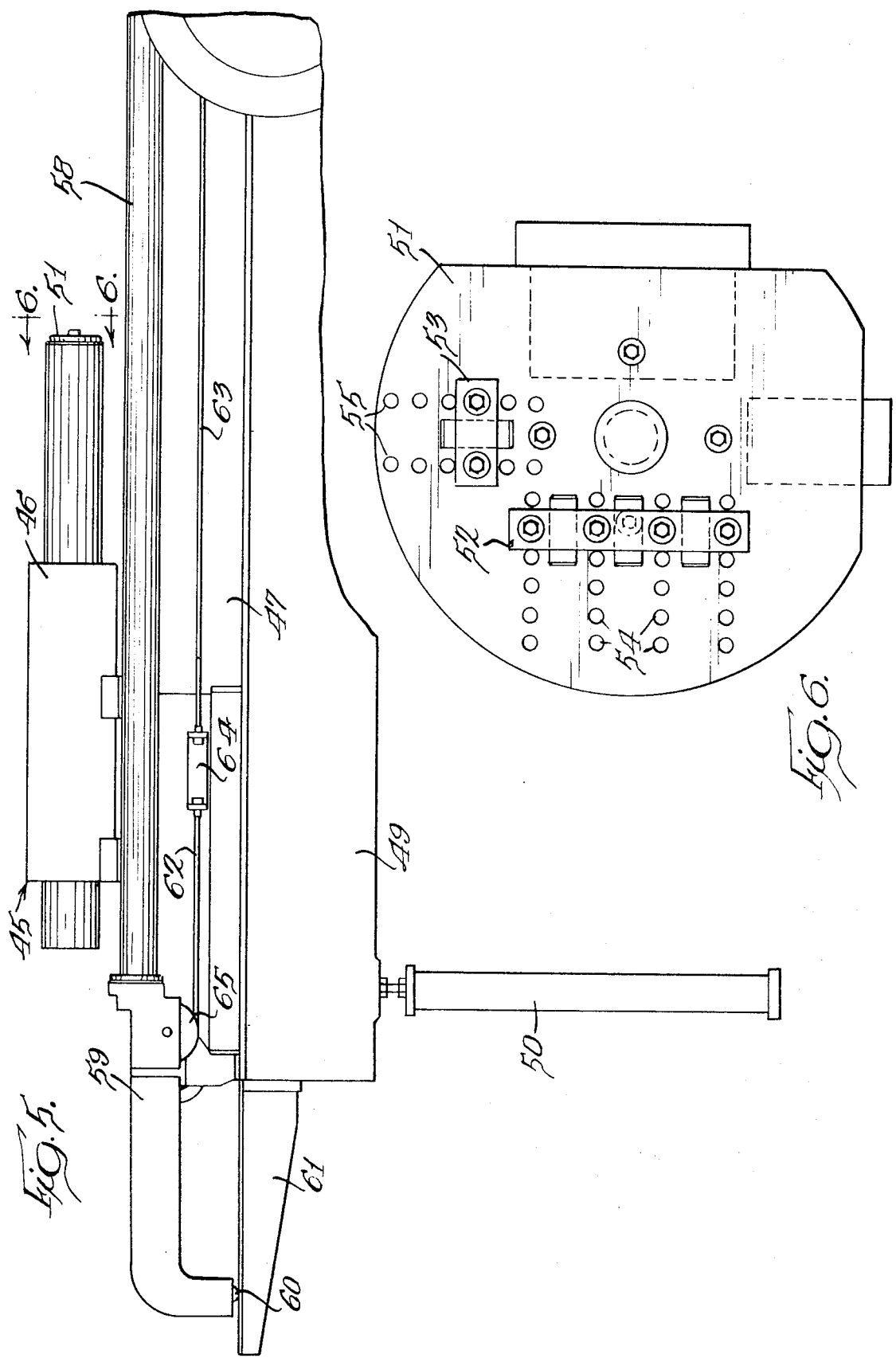

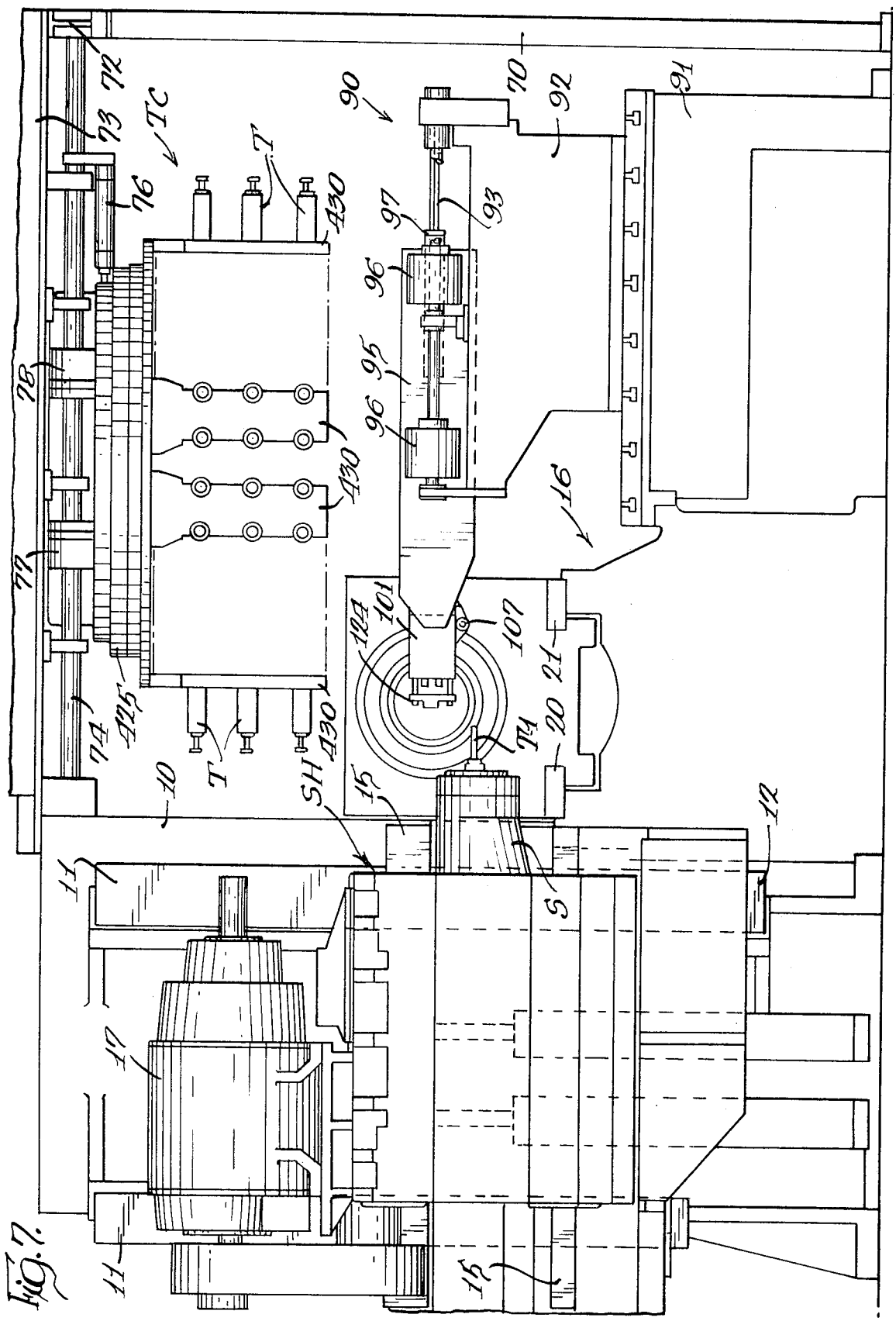

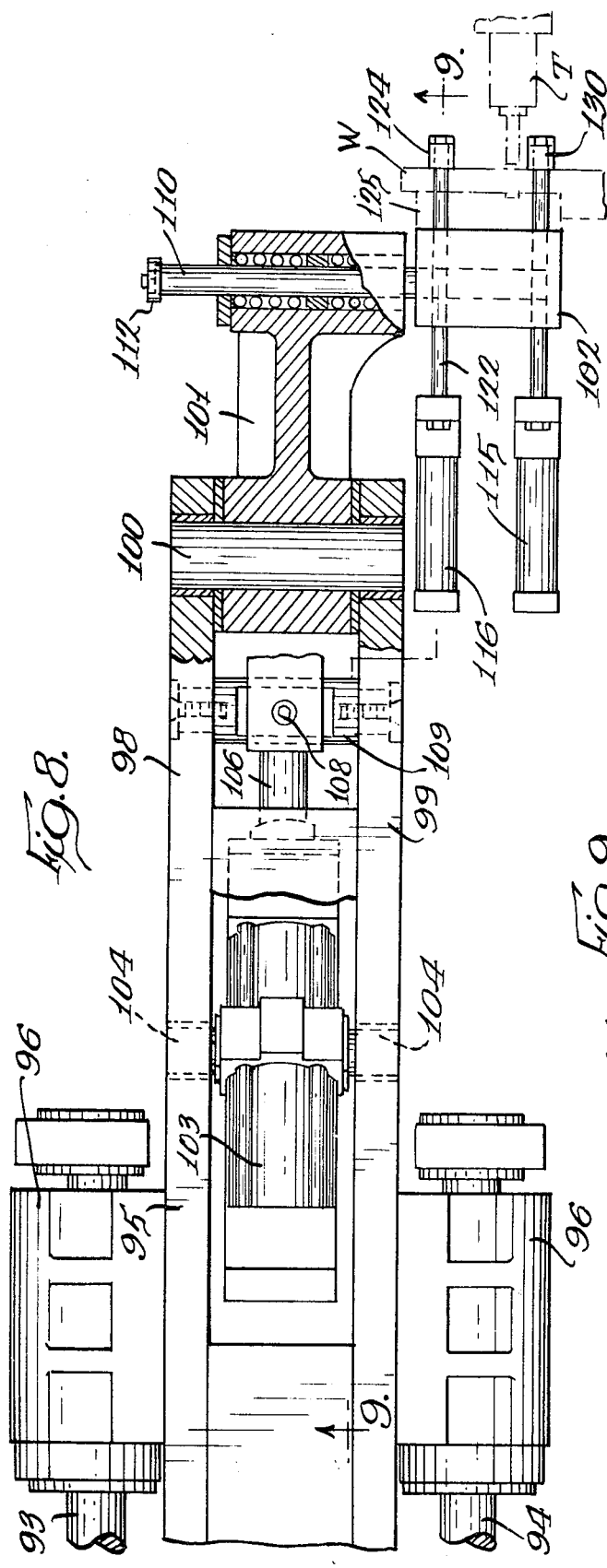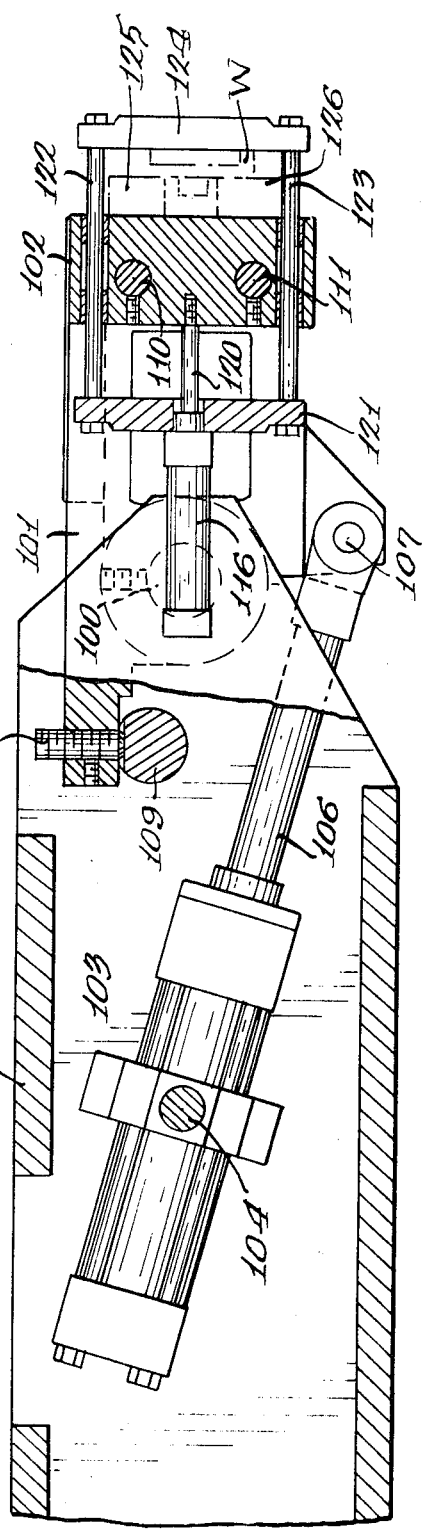

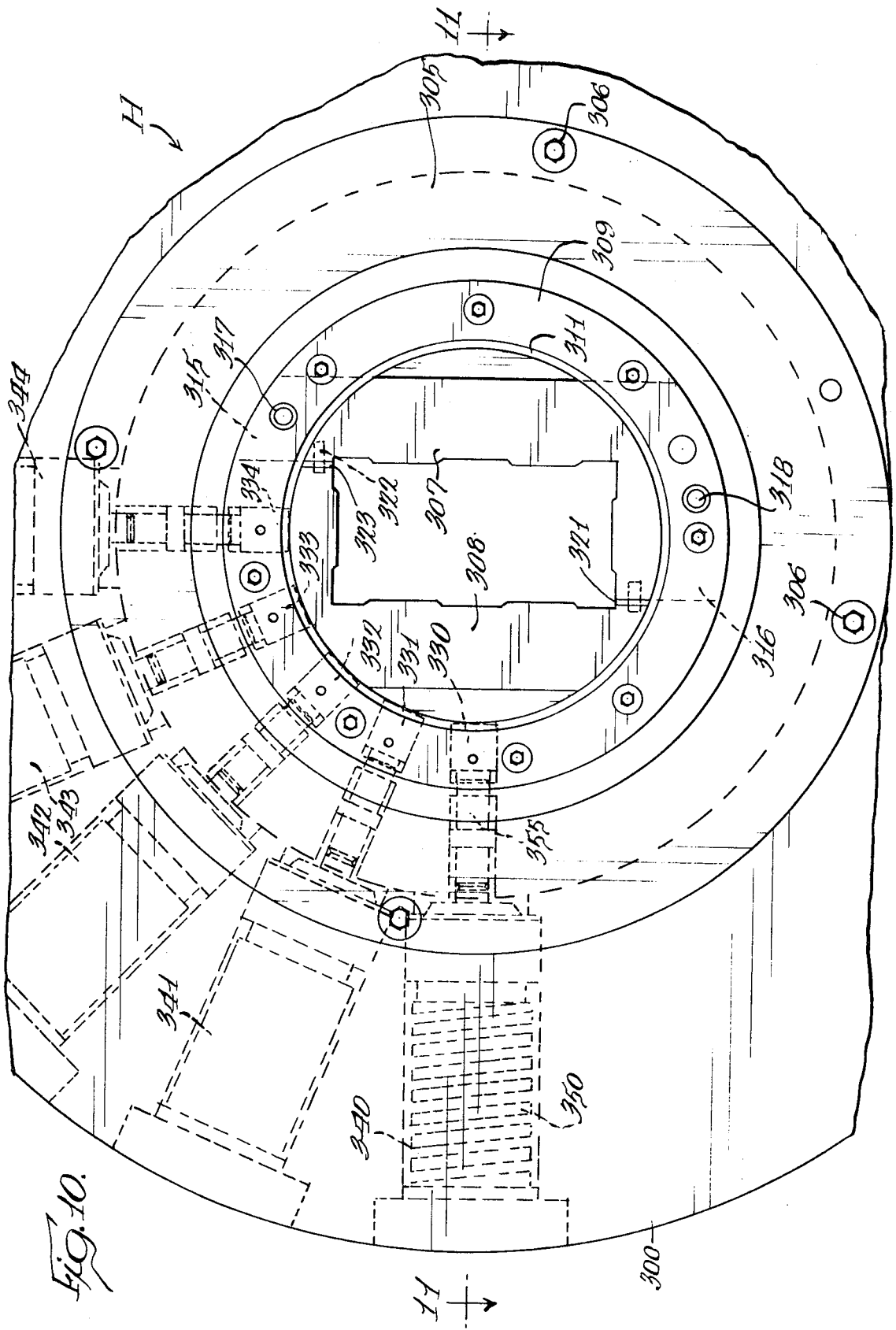

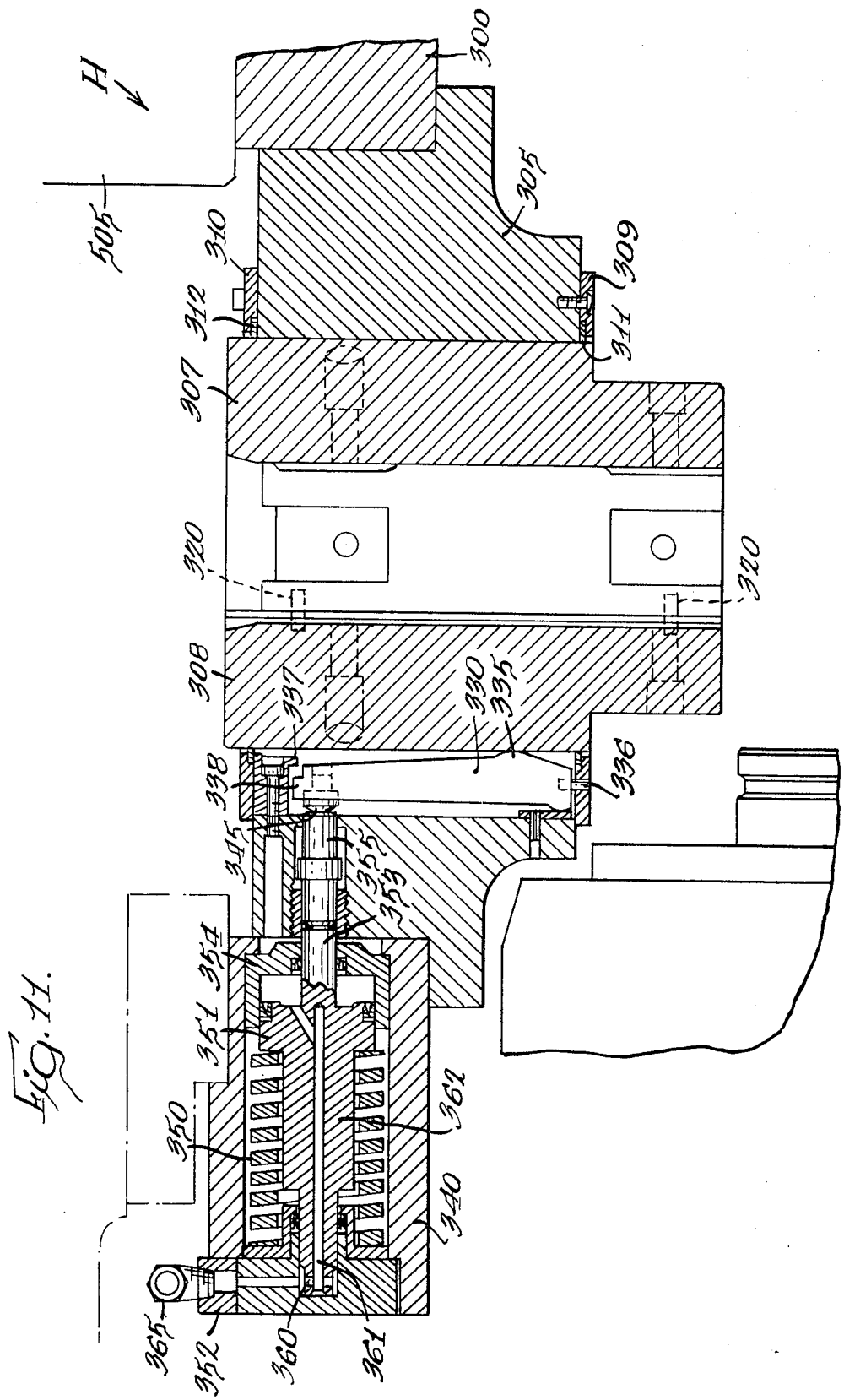

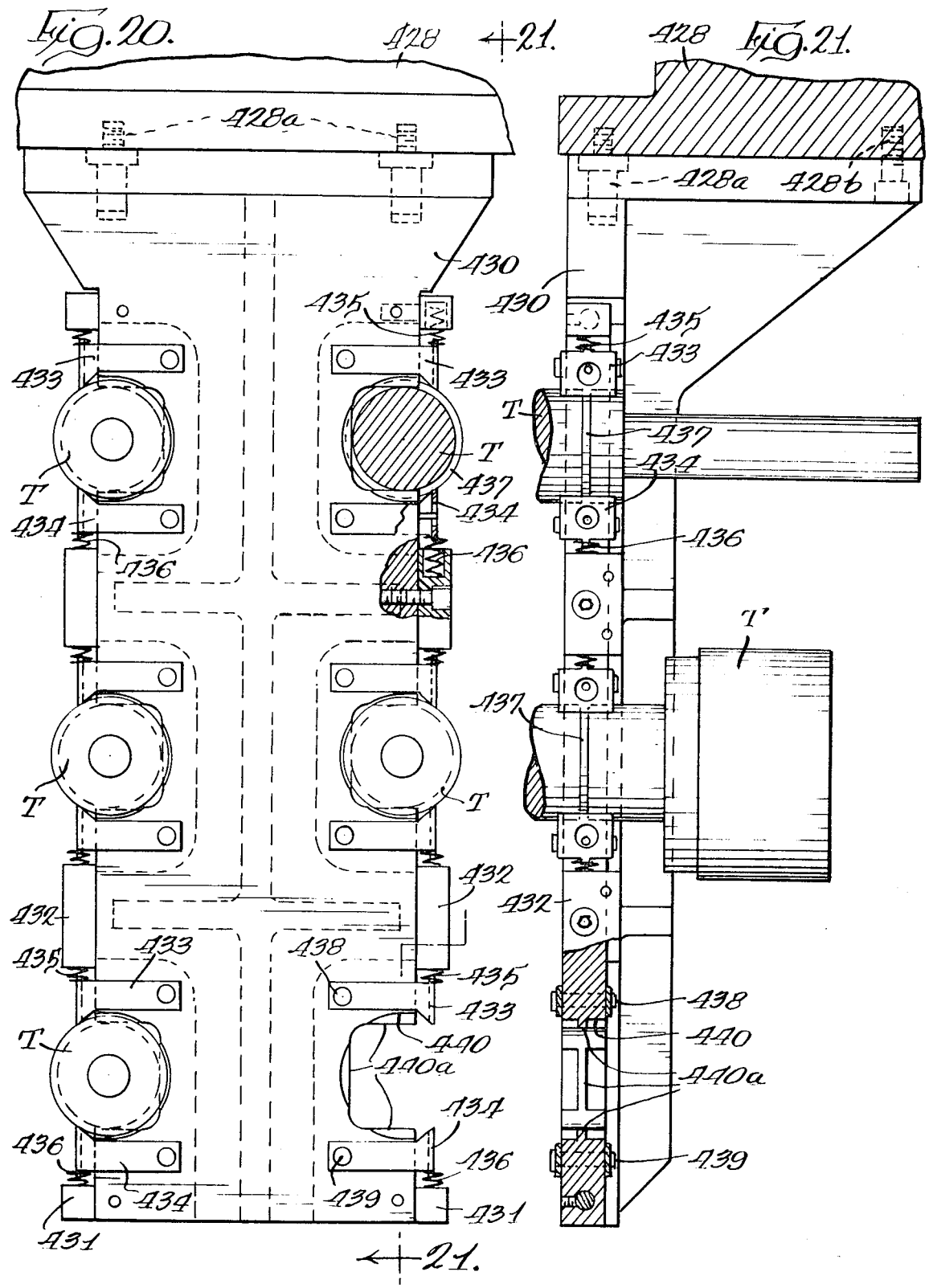

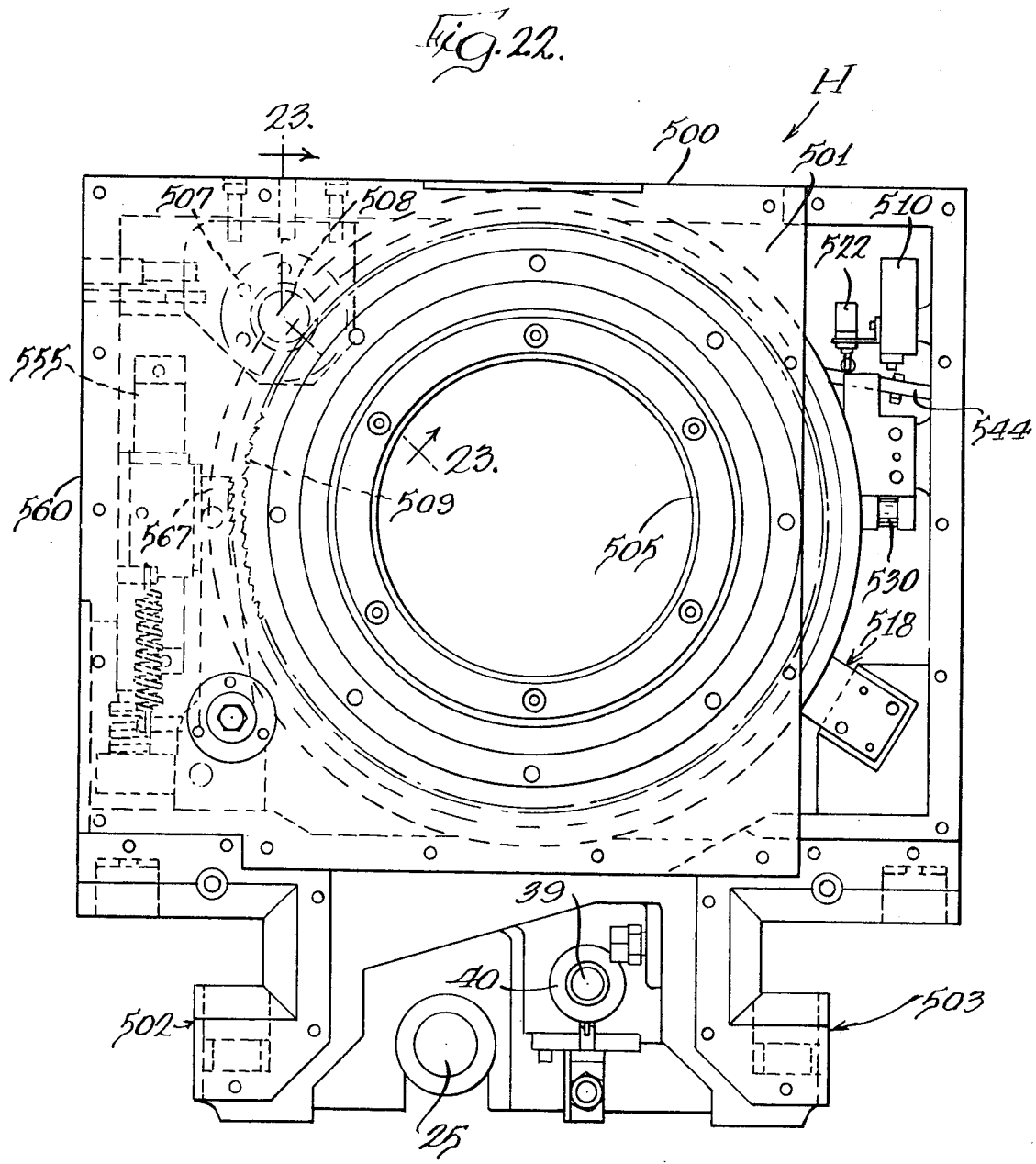

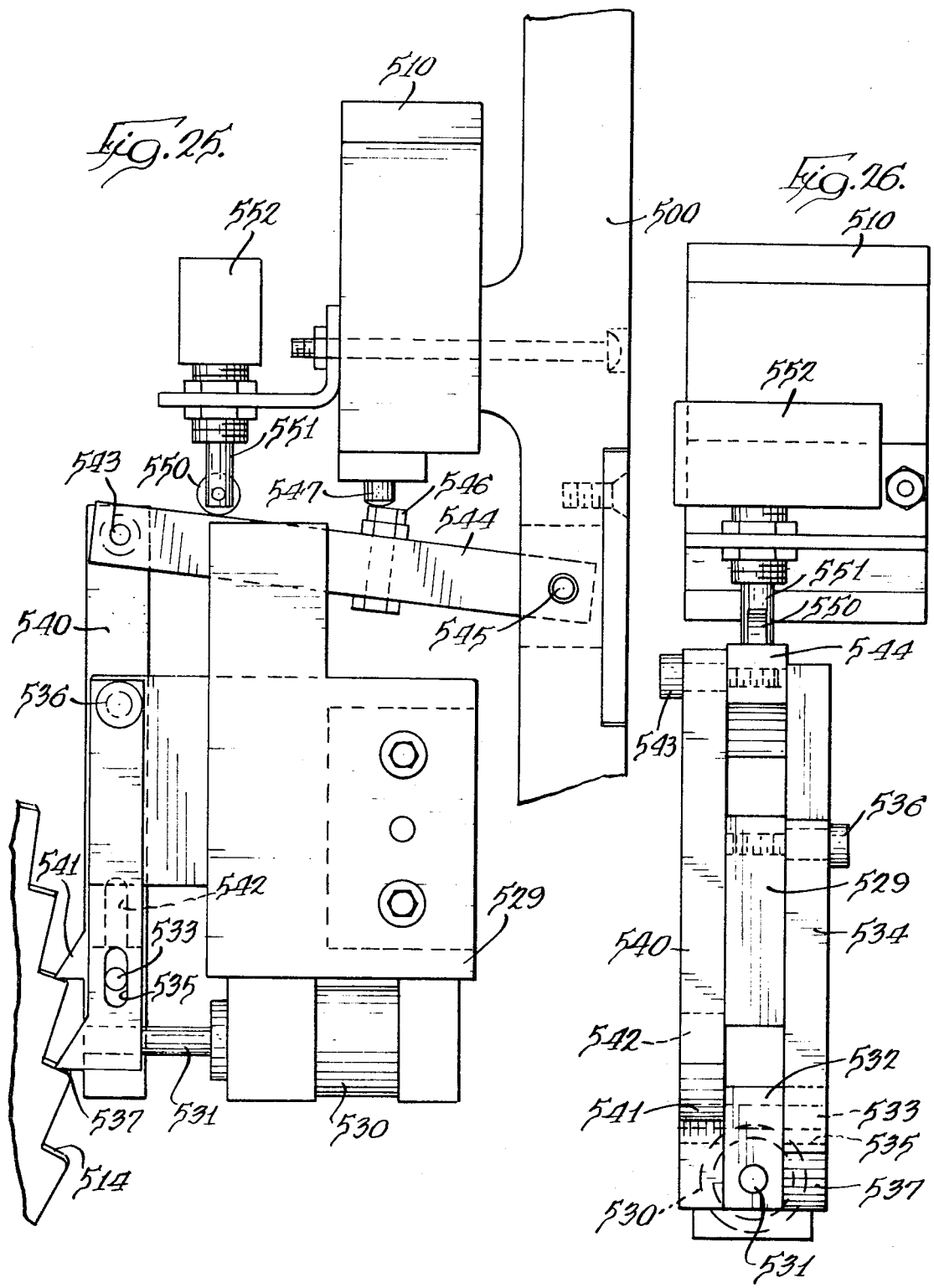

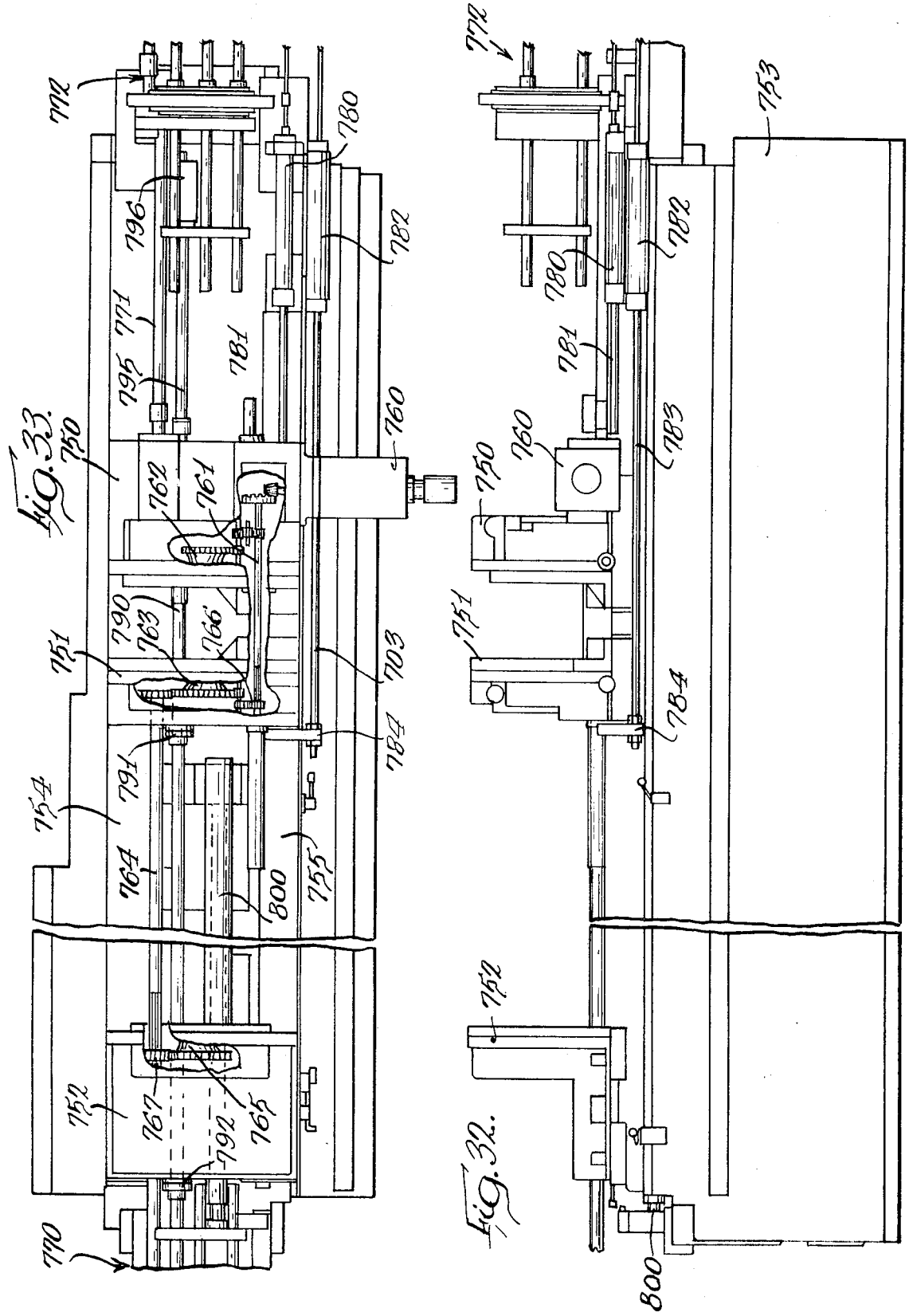

MACHINE TOOL HAVING WORK FEED MEANS

BACKGROUND OF THE INVENTION

This invention pertains to machine tools and, more particularly, to a machine tool for machining a section of a continuous length of bar stock with movement of a tool along axes lying in a plane at an angle to the work axis which is the axis along which the bar stock extends and with the bar stock being movable along the work axis during machining. This invention further pertains to features of a machine tool including spindle locking structure, tool changing structure, as well as differing embodiments of the machine tool and the work supports and handling structure.

At the present time, there are many small parts, such as frame elements required in the aviation industry, which are machined from rolled or extruded bar stock normally having two sections at an angle to each other and which require various contour machining as well as other operations. The individual fixturing of these parts is time-consuming and results in less than complete exposure of the part to a tool for machining. With the structure disclosed herein, it is possible to have the entire part presented to a variety of tools, such as a milling cutter, drill, or other tool, without any fixturing required, since the part to be machined is integral with the length of bar stock whereby the length of bar stock forms the fixture during machining. The part can be machined and then cut off from the length of bar stock by the variety of tools that are available, particularly as provided by a tool changer associated with the tool spindle or, alternatively, by a multispindle head.

Various machine tools are known for machining lengths of stock, including cut-off thereof; however, none of these machine tools have had the versatility to move bar stock to different locations along a work axis during machining and present different surfaces of the bar stock to the tool, including the sixth side of the part which is the final cut off side, and wherein the tool can move along two axes in a plane at an angle to the work axis. The bar stock, itself, becomes the fixture in a work holder for supporting the section of bar stock which is being machined. The machine tool disclosed herein provides for three axes of machining movement, with two of these being provided by movement of the tool and the third being provided by movement of the bar stock along a work axis extending parallel to the length of the bar stock.

SUMMARY

An object of this invention is to provide a new and improved machine tool for machining sections of bar stock with relative motion during cutting accomplished by moving the bar stock along a work axis and moving the tool in two axes of movement lying in a plane which is at an angle to the work axis whereby a section of the bar stock can be presented to the tool and with the orientation of the bar stock to the tool being varied as required during the over-all machining operation.

Another object of the invention is to provide a machine tool as defined in the preceding paragraph for machining types of bar stock, such as rolled or extruded section, wherein the bar stock becomes the fixture and five sides of the bar stock can be machined, as well as the sixth side during cut-off of the machined bar stock section from the remainder of the bar stock. With the construction disclosed herein, a single part can be machined in incremental sections with shift of the bar stock relative to a work holder presenting successive sections into the machining area and upon completion of machining a final cut-off made by moving a tool into the sixth side of the part.

Still another object of this invention is to provide a method of machining bar stock in which the bar stock provides its own fixturing support wherein the machining of the bar stock is done in zones, dependent upon the forces exerted on the bar stock and the cantilever distance of the stock from its location of support with indexing of the work along the work axis for successive zones of machining to result in a final product having several zones of indexed machined area.

A further object of the invention is to provide a machine tool for machining bar stock held in a work holder which is movable to move the bar stock along a work axis relative to a tool that can move along first and second axes with said tool axes lying in a plane at an angle to the work axis and wherein a programmable work stop is movable to a plurality of positions in a plane to align with a desired portion of the adjacent end of the bar stock, with means for moving the bar stock to a position of engagement with the work stop for accurate location of the bar stock whereby it may be gripped by the work holder.

An additional object of the invention is to provide a machine tool as defined in the preceding paragraph wherein the bar stock is moved to a home position with means for shifting the work holder to a controlled position with reference to the home position of the bar stock and then regrip the bar stock by the work holder for controlled location of the bar stock relative to the tool.

Additionally, an object of the invention is to provide a machine tool, as defined in the preceding paragraph, wherein the work holder for the bar stock can be rotated relative to the tool.

Still a further object of the invention is to provide means for holding the bar stock adjacent the free end thereof in order to provide added support for the bar stock during machining and with the holding means in one form functioning as a steady rest for bar stock and transferring strength of the main length of bar stock to the part being machined, and in another form being a second work holder which is programmable along the work axis to vary the length of exposed bar stock between first and second work holders.

A further object of the invention is to provide a machine tool as defined in the preceding paragraph wherein a third work holder is programmable along the work axis and engages the bar stock for support thereof and for feeding thereof relative to the first two work holders which releasably grip the bar stock to permit movement of the bar stock relative thereto.

Further objects of the invention are to provide a new and improved tool changer for association with the machine tool holding a series of tools with their axes disposed in radial disposition relative to the rotational center of the tool changer to increase the spacing between tools and with release of a tool from a gripper in the magazine being accomplished by movement of the gripper transversely to the longitudinal axis of the tool; numerically controlled index mechanism for the tool changer and for the indexable work holder, including a reading system for reading a preselected position and structure for accomplishing a slow-down of the rotation of the part prior to stopping and followed by acceleration of the part in the next operation of indexing the part; accurate and positively operated holding structure for the bar stock and which is mounted in each of the work holders; a multispindle head structure associated with the work holders to provide for fast sequencing of variable tools used in machining of the bar stock; a spindle lock mechanism including structure providing for locking of the spindle in two different rotative positions and shift thereof between said positions; and to provide generally a new and improved organization of structure to facilitate machining of parts of bar stock.

BRIEF DESCRIPTION OF THE DRAWING

FIG. 3 is a fragmentary plan view of the central part of the machine tool shown in FIG. 1;

FIG. 4 is a fragmentary rear elevational view of the tail stock unit shown at the right-hand end of FIG. 1;

FIG. 5 is a rear elevational view of the stock feeder mechanism shown on an enlarged scale and appearing at the left-hand end of FIG. 1;

FIG. 6 is an elevational view of the bar stock engaging end of the feeder unit and taken generally along the line 6—6 in FIG. 5;

FIG. 7 is an end elevational view of the structure shown in FIG. 2;

FIG. 8 is a fragmentary plan view of the work steady rest and unloader with parts in section;

FIG. 9 is a vertical section taken generally along the line 9—9 in FIG. 8;

FIG. 10 is a fragmentary elevational view of the work gripping structure associated with the work holder;

FIG. 11 is a sectional view, taken generally along the line 11—11, in FIG. 10,

FIG. 20 is an elevational view of one tool storage rack of the tool changer magazine, with a portion of the indexable drum carrying the rack being shown;

FIG. 21 is a vertical section, taken generally along the line 21—21 in FIG. 20;

FIG. 22 is a rear elevational view of the work holder with an end panel removed;

FIG. 25 is an enlarged elevational view of the structure shown at the upper right-hand corner of FIG. 22;

FIG. 26 is a side elevational view of the mechanism shown in FIG. 25;

FIG. 32 is a fragmentary front elevational view of another embodiment of the invention utilizing three work holders; and FIG. 33 is a plan view of the structure shown in FIG. 32, with parts broken away.

DESCRIPTION OF THE PREFERRED EMBODIMENTS

Figure 1:
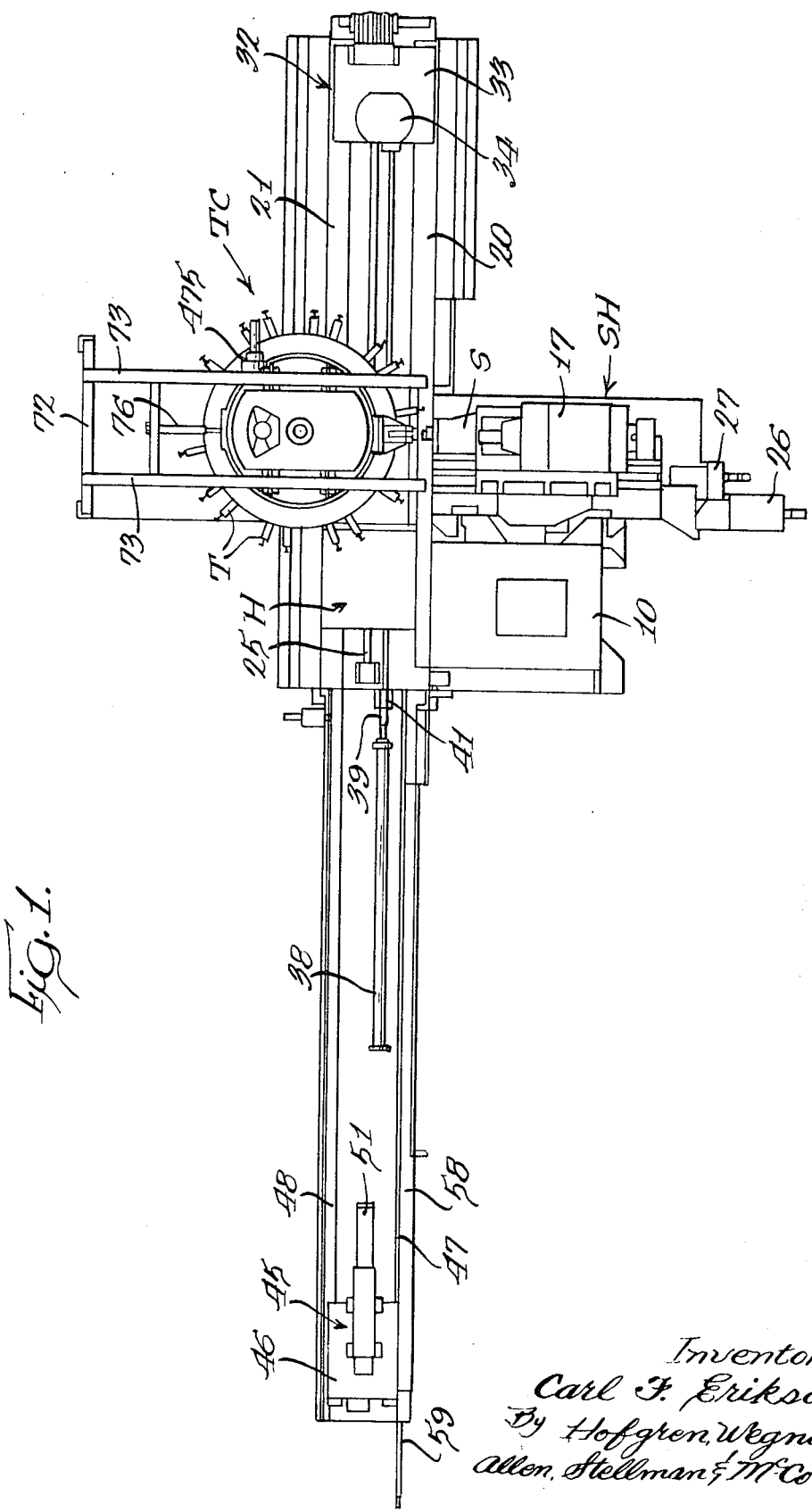
FIG. 1 is a plan view of the preferred embodiment of the machine tool.
Figure 2:
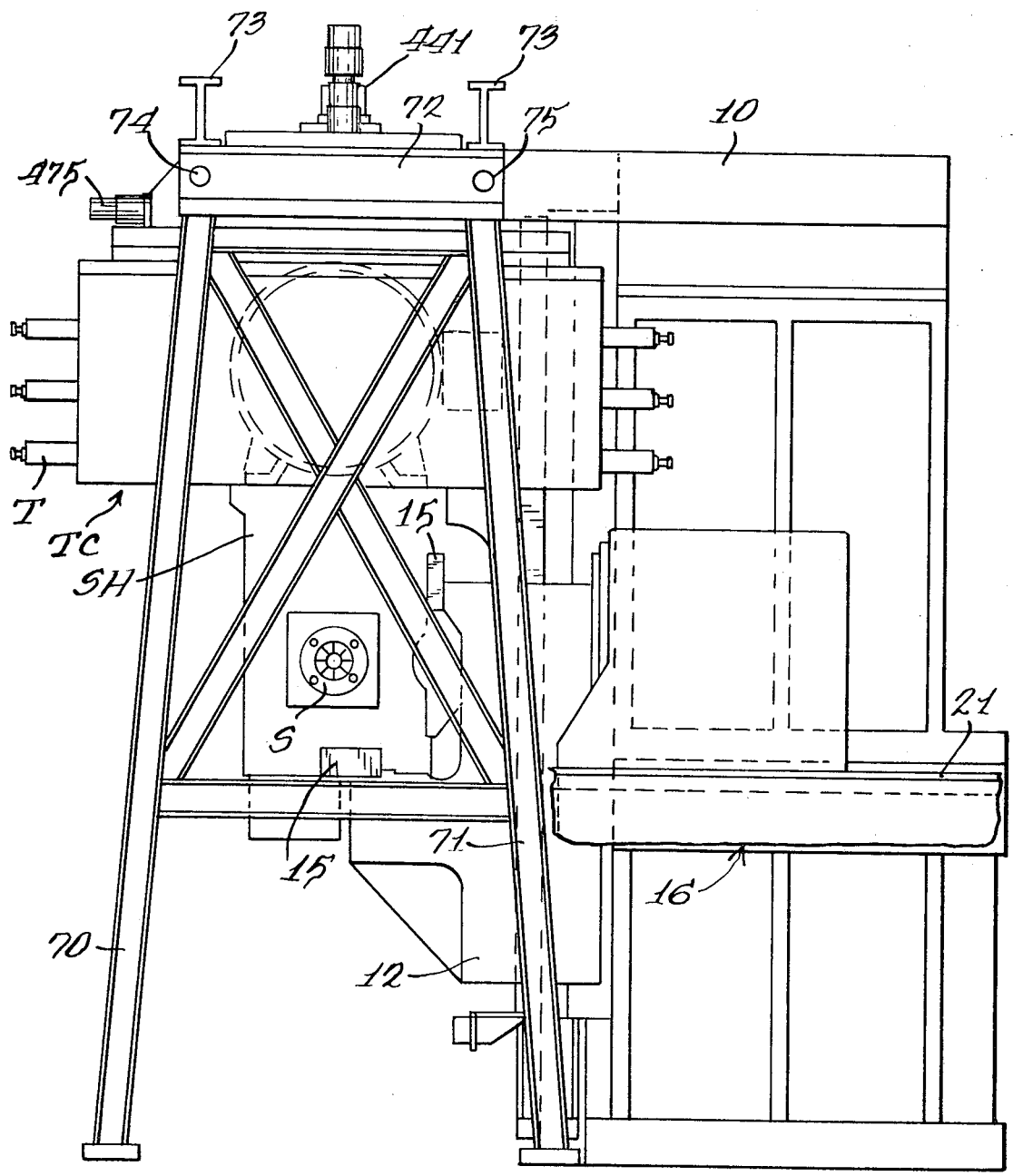
FIG. 2 is a fragmentary front elevational view of the machine tool shown in FIG. 1 on an enlarged scale.

The general organization of the primary embodiment of the invention is shown in FIG. 1. An upstanding column 10 has ways 11 (FIGS. 3 and 7) which mount a saddle 12 for vertical movement. The saddle 12 has horizontally extending ways 15 which movably support a spindle head SH carrying a rotatable spindle S for movement toward and away from a base, indicated generally at 16. The spindle head SH carries a drive motor 17 for the spindle S which drives the spindle through a transmission in a conventional manner. The base 16 is supported from the floor and has a pair of ways 20 and 21 which extend normal to the saddle ways 15 and which movably mount a work holder H, shown in detail in FIGS. 22-27. The work holder H has a central opening along the length thereof with releasable gripping structure for the work in the form of bar stock which can extend beyond the work holder H and both to the right and left thereof, as viewed in FIG. 1. The work holder H disposes the work along a work axis parallel to the base ways 20 and 21.

The movements for the spindle S and the work holder H result in the spindle and a tool carried thereby being movable along a first axis toward the work axis and a second axis at an angle to the first axis with the plane defined by the first and second axes being at an angle to the work axis. The work holder H is moved along the work axis and along the ways 20 and 21 by power derived from a rotatable lead screw 25 rotatably mounted on the base of the machine tool and driven by a motor 30 (FIG. 4). With a length of bar stock exposed outwardly of the work holder H in the machining area and to the right of the work holder, as viewed in FIG. 1, the location of the bar stock relative to a tool in the spindle S can be varied by positioning of the work holder H along the work axis. This position can vary during the machining cycle when cutting a contour or other shape having a component extending parallel to the work axis. Additionally, the part can be rotatably indexed to present a desired orientation of the bar stock to a tool by the indexing mechanism for the work holder H, described subsequently.

A pair of motors 26 and 27 (FIG. 1) are provided for moving the saddle 15 along the column ways and for moving the spindle head SH along the saddle ways, respectively. These motors drive lead screws connected with the associated part with the motor 26 actually driving a lead screw extending at a right angle to the output shaft of the motor and parallel to the height of the column.

Associated with the work holder H is a tail stock unit, indicated generally at 32, which has a casing 33 movable along the base ways 20 and 21 and having an indexable head 34 with a tail stock 35 and a live center 36 driven from a motor 37. By indexing of the unit 34, either the tail stock 35 or the live center 36 can be positioned in facing relation to the work holder H and used to engage the bar stock, if required. The tail sock unit 32 is positionable relative to the work holder H by a cylinder 38 (FIG. 1) having a rod 39 which extends from the cylinder 38 toward the right, as viewed in FIG. 1, through the work holder H to a fixed connection with the tail stock casing 33. The degree of extension of the rod 39 relative to the cylinder 38 can be varied to control the distance of the tail stock unit 32 from the work holder H, also taking into account the physical location of the work holder H along the ways 20 and 21. Once a desired distance is obtained therebetween, the tail stock can move in synchronism with the work holder H to support a section of bar stock extending therebetween. This is accomplished by having a hydraulically operated binder 40 (FIG. 22) on the work holder H surrounding the tail stock cylinder rod 39 and movable into gripping relation therewith. When the binder 40 is hydraulically clamped onto the cylinder rod 39 and the cylinder 38 is neutralized, movement of the work holder H by the lead screw 25 will cause simultaneous movement of the tail stock unit 32. Additionally, there is a hydraulic binder 41 on the base which can be operated selectively to grip the tail stock cylinder rod 39 and hold the tail stock unit in fixed position.

A stock feed unit, indicated generally at 45, and shown particularly in FIG. 5, has a carriage 46 mounted on ways 47 and 48 which are extensions of the base ways 20 and 21 formed on a bed member 49 supported by legs, such as indicated at 50 and connected to one end of the base 16. The stock feed unit 45 has a face plate 51, shown particularly in FIG. 6, with a pair of locatable plates 52 and 53 positionable in the series of openings 54 and 55, respectively. The plates can be positioned in accordance with the cross-sectional contour of the bar stock and engage and guide the free end thereof whereby, as the stock feed unit 45 advances towards the work holder H, the work is pushed through the central opening of the work holder for adjustment relative thereto.

The stock feeder 45 is caused to move with the work holder H during machining to support the end of the bar stock by an interconnection including a cylinder 58 of substantial length which has one end connected to the work holder H and has its other end connected to a carriage 59 having a roller 60 movable along a support 61 extending from an end of the bed member 49. The cylinder has an internal piston and opposite sides of said piston are connected to a pair of cable lengths 62 and 63, with the adjacent exposed ends of the cables 62 and 63 connected to a bracket 64 secured to the carriage 46 of the stock feed unit. As the cable lengths 62 and 63 leave opposite ends of the cylinder, they pass about rollers at the ends of the cylinder with the roller 65 for the cable 62 being shown in FIG. 5. There are fluid line connections to opposite ends of the cylinder 58 whereby the piston disposed within the cylinder can be variably positioned along the length of the cylinder which results in shift of the cables 62 and 63 and resulting movement of the stock feed unit 45 relative to the work holder H.

In operation, a length of bar stock is positioned within the work holder H and gripped by mechanism disposed within the work holder. After the desired machining has been performed on an exposed length of bar stock in the machining area adjacent the spindle S, the work holder gripping structure is released to free the bar stock for movement relative thereto. In one mode of operation, a special tool T1 (FIG. 7) is positioned in the spindle S and the spindle located along its two axes of movement to have the tool T1 positioned to engage a certain part of the bar stock extending from the work holder. With this positioning of the special tool T1, the stock feed unit 45 can be advanced by actuation of the cylinder 58 to move the bar stock against the special tool T1. With the work holder H in position as desired along the base ways 20 and 21 by operation of the lead screw 25 and its motor 30, the gripping mechanism within the work holder is caused to again grip the bar stock and machining of the exposed section of bar stock can begin.

The tool changer TC is shown generally in FIGS. 1-3 and 7 and is disclosed in detail in FIGS. 14-21. The tool changer TC carries a plurality of tools T with their longitudinal axes disposed radially of a center of indexable rotation of the tool changer. The tool changer TC is supported in elevated position by a frame having a pair of floor engaging legs 70 and 71 which extend upwardly to a connecting plate 72 which has a bridge member 73 running to the column 10. A pair of guide rods 74 and 75 depend from the bridging member 73 and movably mount the tool changer TC for movement between a retracted position, which is shown in FIG. 7, and an advanced position wherein the tool changer has moved toward the left as viewed in FIG. 7. This movement of the tool changer is derived from a power cylinder 76 connected between the rods 74 and 75 and a casing 425 of the tool changer. The casing 425 has a series of apertured arms 77, 78, 79 and 80 which mount the tool changer for movement along the guide rods 74 and 75.

The construction of the tool changer TC is described hereinafter. However, the general sequence of operation thereof with the spindle S is now referred to. Assuming the special tool T1 shown in the spindle in FIG. 7 has been used to locate the bar stock and a machine cycle is to occur, the spindle S is elevated to a particular level to coincide with one of the levels of the tools T held in the tool changer. The spindle is also positioned at the appropriate location along the saddle ways 15. A gripper on the tool changer is empty and is to receive the special tool T1. As the spindle S is moving up, the tool changer TC can be moved into position by cylinder 76, since the special tool will move up in a space between the spaced-apart tool supporting racks. When the spindle S is at the desired level and at the desired degree of extension, the tool changer is rotated a slight amount to cause the tool grippers to grip the special tool T1 and spindle S can then back off along the saddle ways 15 to locate the spindle S at a distance free of the tools T held in the tool changer. The tool changer is then indexed to bring the desired vertical row of tools containing the next tool to be used into position. At the same time, the spindle S can be moved relative to the column ways 11 to bring the spindle to the desired level for the selected tool. The spindle S is then advanced to receive the selected tool T and the tool changer is then rotated slightly in one direction or the other depending upon which way the open-sided gripper faces to release the tool from the gripper and the tool changer then moves away to an out-of-the-way position during machining. The spindle S is then moved, as required, for the desired machining operation.

AUXILIARY WORK SUPPORT AND WORK UNLOADER

The auxiliary work support and work unloader is indicated generally at 90 in FIG. 7 and is shown in detail in FIGS. 8 and 9. A base 91 has an upper part 92 provided with a pair of guide rods 93 and 94 on which a carrier 95 is movable by support of the carrier by ears 96 on the guide rods 93 and 94. A main cylinder 97 connects between the carriage 95 and the base part 92 to shift the carriage along the rods between the advanced position, shown in FIG. 7, and a retracted position. The carriage at its forward end terminates in a pair of spaced-apart plates 98 and 99 which mount a pivot pin 100 which pivotally mounts an arm 101 carrying a frame 102. The frame 102 is pivoted about the pin 100 by a cylinder 103 pivotally pinned to the carrier 95 by pins 104 in the arms 98 and 99 and having a cylinder rod 106 pinned at 107 to the arm 101. The counterclockwise pivoting of the arm 101 is limited, as shown in FIG. 9, by the abutment of an adjustable screw 108 carried at the rear of the arm, with a fixed abutment 109 extending between the carriage arms 98 and 99.

The frame 102 is carried by a pair of rods 110 and 111 positioned, one above the other, which are fastened to the frame 102 and movable within ball bushings in openings in the arm 101. Spring means (not shown) urge the frame 102 away from the arm 101. This movement is limited by stops on the ends of the rods 110 and 111 with a stop 112 being shown on the end of the rods 110 and engageable with the arm 101.

The frame 102 carries two independently operable sets of rod with one set of the grippers being associated with a fluid cylinder 115 and the other set being associated with a cylinder 116. The structure associated with each of the cylinders is the same and that associated with cylinder 116 is shown particularly in FIG. 9. The cylinder 116 has its rod 120 fastened to the frame 102 and with the cylinder casing fastened to an upright plate 121 which through a pair of rods 122 and 123 positioned one above the other and movably guided in the frame on bushings, carries at its outer end a gripper jaw 124. This gripper jaw can carry a suitable number of added parts to fit the contour of the bar stock indicated at W or, as shown, can have a flat face to engage against the work W. The other gripper jaw is formed by a pair of suitably shaped blocks 125 and 126 which are fastened to the forward face of the frame 102 and which engage against surfaces of the bar stock W.

The gripper jaw structure associated with the cylinder 115 is of the same construction, with the outer gripper jaw being identified at 130.

The bar stock can be gripped at both sides of a tool T, as shown in FIG. 8, and through the frame 102 the gripper structure associated with the cylinder 116 firmly supports the free end of the bar stock by transferred support from the grippers associated with the cylinder 115 which are gripping the bar stock securely held by the work holder H. This unit can float with the bar stock as it is shifted along the work axis during machining because of the floating mounting of the guide rods 110 and 111 in the arm 101.

This unit further can function as an unloader for the part that has been machined and cut off from the bar stock extending from the work holder H by release of the gripper jaws associated with the cylinder 115 which releases the bar stock and permits retraction of the unmachined length of bar stock by retracting movement of the work holder H. The finished part is still held by the gripper jaw 124 and when the continuous length of bar stock is retracted, the cylinder 103 can be operated to pivot the arm 101 downwardly and carry the finished part to an unloading position where the gripper jaws are released.

WORK HOLDER GRIPPING MECHANISM

The work holder H has a gripping structure for the bar stock mounted on a face of a work spindle 505 of the work holder H. The work holder, and mechanism contained therein, is shown particularly in FIGS. 22–27 and described subsequently. A portion of the work holder head is shown in outline in FIG. 11. The gripping structure includes an annular ring 300 which is attached to a face of the work spindle 505 of the work holder by bolts, not shown. A jaw housing 305, in the form of an annular ring, is attached to ring 300 by bolts 306. The jaw housing 305 has an interior opening which receives a pair of jaw elements 307 and 308. These elements have an outer curved surface to fit the curvature of the opening in the jaw housing 305 and define an interior opening shaped as shown in FIG. 10 to receive bar stock having a similar external contour. With the possible machining of many different contours of bar stock, the only requirement is that there be a set of shaped jaw elements 307 and 308 to fit within the jaw housing for gripping the particular part. The jaw elements 307 and 308 are confined between end rings 309 and 310 carrying annular wipers 311 and 312, respectively. The jaw elements 307 and 308 are held in position in the jaw housing by a pair of ears extending outwardly from the jaw element 307 and identified at 315 and 316 which are attached to the face of the jaw housing 305 by attaching means 317 and 318, respectively. The jaw element 308 is movably connected to the jaw element 307 by a set of lower spaced pins 320 movably guiding the jaw element 308 on the element 307 and with the adjacent portions of the jaw elements being held yieldably apart by a strip 321 of resilient material, such as rubber. An upper set of guide pins 322 and a resilient spacing strip 323 guide the upper adjacent parts of the jaw elements 307 and 308. With the movement of the jaw elements permitted by the movement on the guide pins 320 and 322, the bar stock can be firmly gripped between the jaws. The jaw element 308 is urged toward jaw 307 by forces having a resultant force vector with both vertical and horizontal components to firmly locate and grip the work against the fixed jaw 307 and with this force being effective as permitted by the movement on the guide pins 320 and 322.

The jaw 308 is urged toward the fixed jaw 307 by a series of rockable actuating fingers 330–334 disposed around one quadrant of the jaw 308 and having an intermediate portion 335 of the finger, as shown for finger 330 in FIG. 11, engageable with the outer periphery of the jaw 308. Each of the fingers, as shown for the finger 330 in FIG. 11, is retained movably by means of a pin 336 loosely fitted into one end of the finger and by a surface 337 extending in line with a stepped end 338 of the finger and permitting movement thereof while preventing complete fall out of the finger.

The fingers 330–334 are urged pivotally in a direction to exert compressive force on the jaw 308 by a series of spring units 340–344 mounted on the jaw chuck 300 and in alignment with an actuating button on the respective fingers 330–334, with the button for finger 330 being identified at 345. Each of the spring units 340–344 includes a cylindrical chamber mounting a spring 350 acting against a piston 351 and, at its other end, engaging a fixed abutment 352. The piston 351 has a stem 353 extending outwardly through a cap 354 and into engagement with a motion-transmitting pin 355 in the jaw housing 305, whereby the position of the stem 353 is transmitted through the pin 355 to the finger 330. In order to relax the jaw 308, each of the pistons 351 can be hydraulically retracted by delivering fluid under pressure to the space between the piston 351 and the cap 354. This fluid delivery is from an inlet passage 360 which communicates with a passage 361 in a piston rod 362 and extends through the piston 351.

The inlet passages 360 for the units 340–344 are fed from a piping system, including a pipe 365. The pipe system is in constant communication with a source of fluid under pressure connected to the work holder H and by a connection (not shown) which permits communication between the rotatably positionable bar stock gripping structure relative to the head of the work holder H.

The structure described permits releasable gripping of bar stock along a portion of its length with firm gripping of the bar stock during machining and for release of the grip whereby the bar stock can be shifted relative to the work holder H and the jaws carried thereby. The actuating mechanism for the jaws is usable with many different jaw sets, since they would have the same external periphery and would only differ in the interior opening configuration to coact with bar stock having a particular external configuration.

SPINDLE POSITIONING MECHANISM

Figure 12:
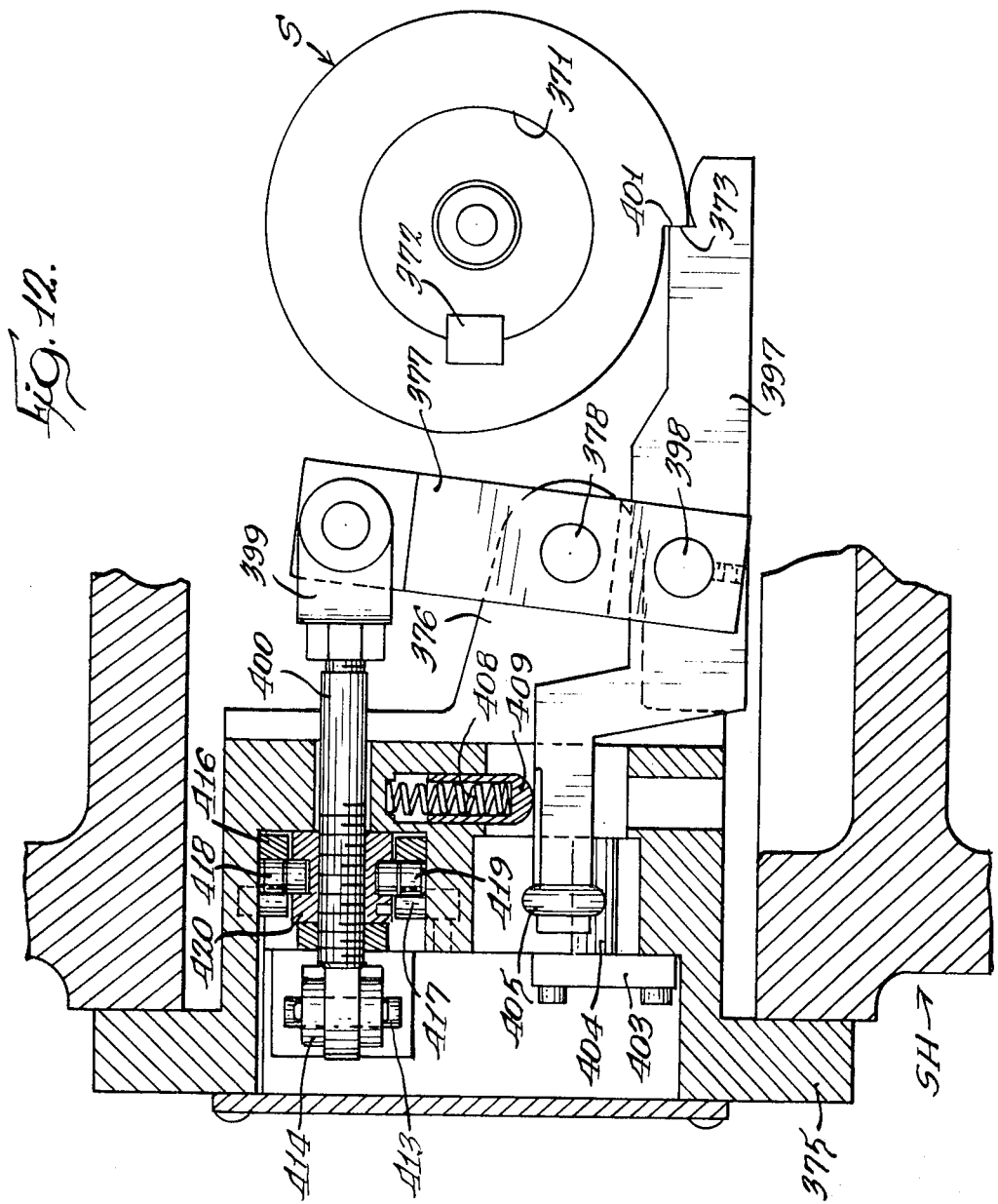
FIG. 12 is an elevational view of the spindle and the spindle lock mechanism associated therewith and taken generally along the line 12—12 in FIG. 13.
Figure 13:
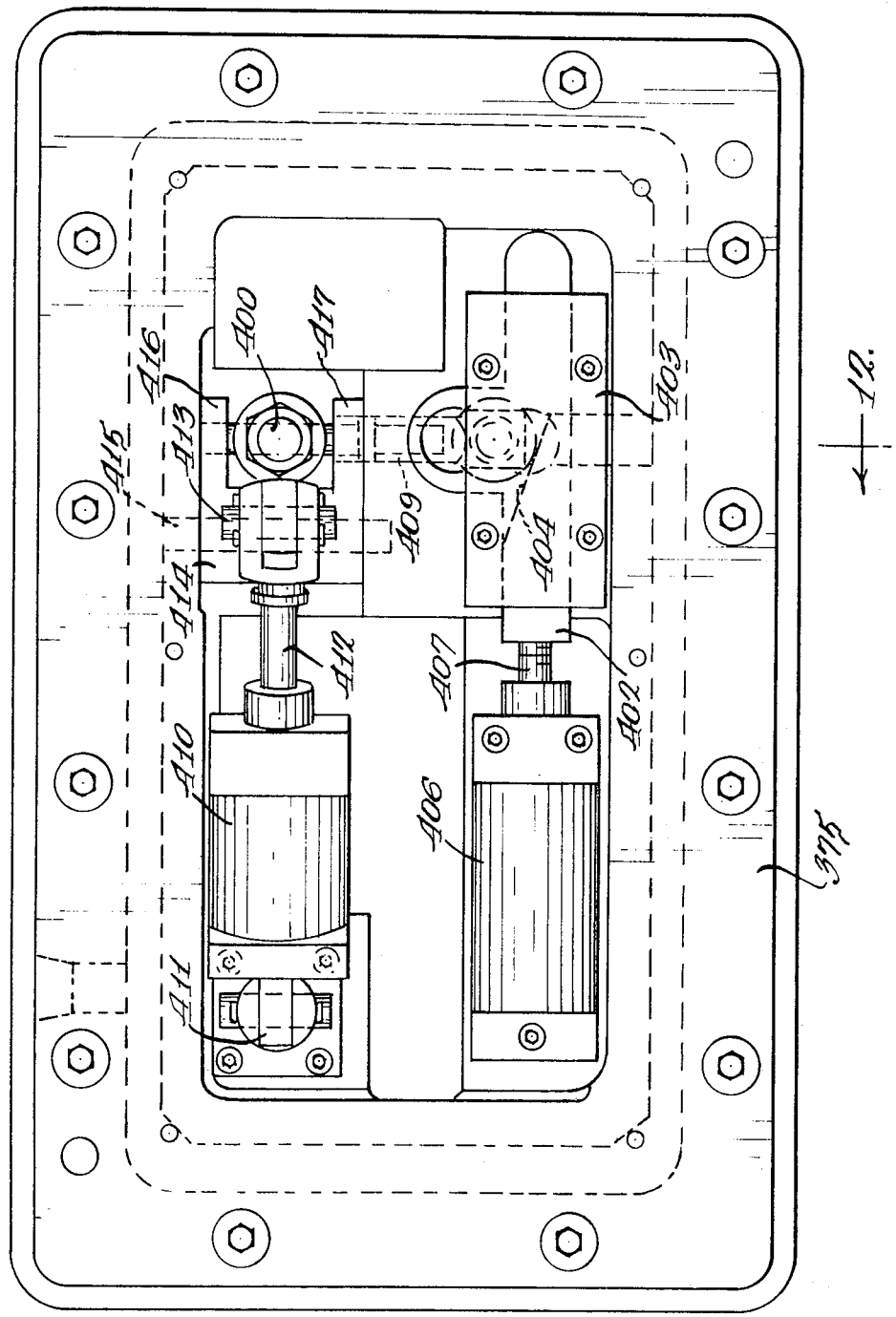
FIG. 13 is an elevational view, looking toward the left-hand side of FIG. 12.
Figure 14:
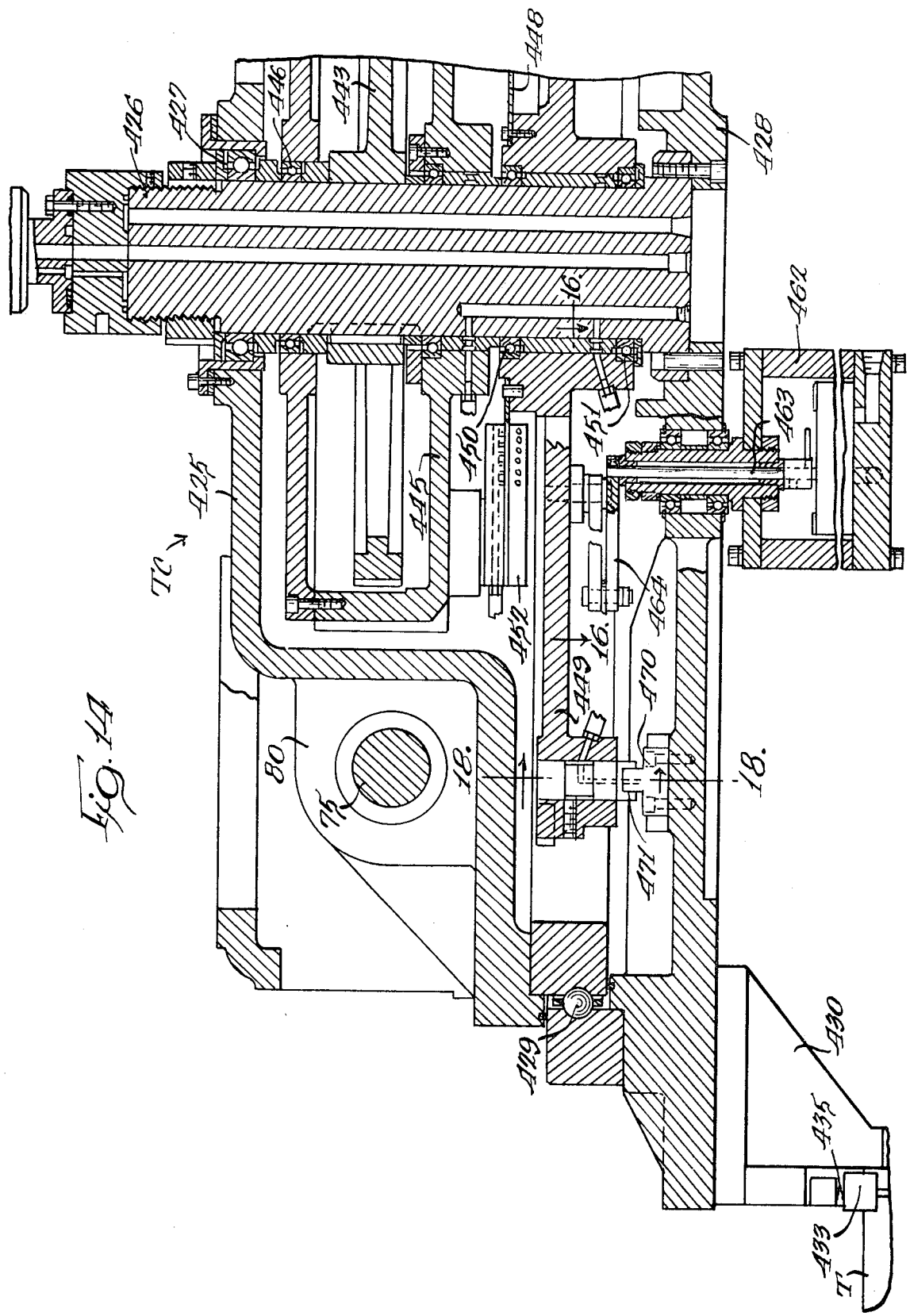
FIG. 14 is a central vertical section showing a portion of the tool changer and the drive mechanism therefor.

This mechanism is shown particularly in FIGS. 12 and 13 wherein the spindle S has an interior opening 371 to receive a tool and has a key 372 to interfit with a keyway on the tool or an adapter associated with the tool to interlock the tool and spindle for rotation. The exterior surface of the spindle is provided with a shoulder 373 for coaction with the spindle locking mechanism. The spindle locking mechanism includes a frame member 375 fitted in an interior opening in the spindle head SH. The frame member 375 has a pair of spaced ears, one of which is shown at 376, and which pivotally mount a lever 377 by a pin 378. This lever has a latch lever 379 pivotally mounted to one end thereof by a pin 398, and the opposite end of the lever has a clevis 399 pivotally connected thereto and with a rod 400 extending from the clevis. The latch lever 397 can pivot about the pin 398 between the shoulder-engaging position, shown in FIG. 12, and a position counterclockwise thereof to position a latch surface 401 on the latch lever 397 beneath the shoulder 373 of the spindle. The position of the latch lever 397 is controlled by a reciprocal cam block 402 movably guided in the frame member 375 and confined in position by an attachable plate 403. The cam block 402 has an inclined camming surface 404 which coacts with a follower roller 405 on an end of the latch lever 397. The cam block 402 is positioned in either a retracted or extended position by an actuating cylinder 406 mounted on the frame member 375 and having a rod 407 extending therefrom and connected to the cam block 402. With the cam block 402 retracted as shown in FIG. 13, the follower roller 405 is on a lower part of the cam surface 404 and the latch lever 397 is in locking position, with this position being caused by urging of a spring 408 confined within a movable cap 409 and acting on the top surface of the latch lever 397. This spring urges the follower roller 405 against the cam surface 404 at all times and, when permitted by the cam surface, causes the latch surface 401 to be positioned, as shown in FIG. 12, to engage the shoulder 373 on the spindle.

The spindle S can be locked in two different rotative positions, with one position being shown in FIG. 12 and the other position has the spindle in a rotative position slightly counterclockwise of that shown in FIG. 12. This mechanism also provides powered shift of the spindle or suitable tool holder from the position shown in FIG. 12 to a counterclockwise rotative position from that shown.

This mechanism includes a fluid actuator cylinder 410 pivotally mounted to the frame member 375 at 411 and having a shiftable actuator rod 412 connected by a pin 413 to a bell crank 414 which is pivoted to the frame member 375 by a pivot pin 415 and which has spaced arms 416 and 417 carrying pins 418 and 419, respectively, engaging in a groove in a collar 420 threaded onto the rod 400.

The parts, as shown in FIGS. 12 and 13, have the actuator rod 412 extended to have the collar 420 abutting against an adjacent part of the frame member 375 which positions the latch lever 397 at a location to lock the spindle S in the position shown in FIG. 12. Upon reversal of energization of the actuator 410, the rod 412 is retracted which, through the interengaging linkage, shifts the rod 400 toward the left, as viewed in FIG. 12. This shifts the latch surface 401 toward the right, as viewed in FIG. 12. If the spindle is already locked, this results in counterclockwise rotation of the spindle S or if the parts are being positioned preliminarily to locking of the spindle S, then the latch shoulder 401 is positioned to the right of the position shown in FIG. 12 awaiting engagement of the spindle shoulder 373. Either of these locations of the latch lever, determined by the actuator 410, are permitted by the surface engagement between the follower roller 405 on the latch lever 397 and the cam surface 404 of the cam block 402.

Suitable control is provided for the spindle drive to reduce the speed and terminate rotation of the spindle S upon locking thereof.

The locking of the spindle permits use of lathe tools and rotation of the work holders in the second and third embodiments, disclosed hereinafter, at a sufficiently high rate of speed permits turning operations.

TOOL CHANGER

The tool changer is shown in detail in FIGS. 14 to 21, inclusive. The frame 425 is movable along the pair of spaced parallel rods 74 and 75 for advancement of the tool changer relative to the spindle S during a tool change operation. The casing rotatably mounts, centrally thereof, a shaft 426 by bearings 427 fitted in an upper opening in the casing 425 and with the lower end of the shaft having a drum 428 secured thereto which, at its outer perimeter, is rotatably connected to the casing 425 by ball bearings 429 fitted between flanges of the drum 428 and casing 425. The drum 428 has a series of dependent spaced-apart elongate racks 430, as shown generally in FIG. 7, with one of the racks shown particularly in FIGS. 20 and 21. The rack 430 is removably fastened to the underside of the perimeter of drum 428 by locating pins 428a fitted into the drum 428 and attaching threaded members 428b (FIG. 21). The racks 430 are spaced a distance from each other and the racks have opposite vertical sides 431 and 432 each having a series of outwardly-opening tool grippers for holding tools T. Each of these grippers is generally the same with a notch formed in the vertical side of the rack and with a pair of gripper fingers 433 and 434 spring-loaded toward the notch by springs 435 and 436, respectively, to engage the fingers in a tool handling groove 437 of the tool or an adapter associated with the tool. A tool T is removed from a slot in the rack by relative movement between the tool and the rack in a direction transverse to the length of the tool whereby the fingers 433 and 434 are cammed outwardly by the curvature of the tool or the tool adapter to free the tool. Reinsertion of the tool is in the opposite manner wherein the relative movement causes the fingers to be cammed outwardly until the tool handling groove 437 has moved into the notch and the fingers 433 and 434 can move back into holding relation with the handling groove. In these relative movements, the tool is held by the spindle S. As seen particularly in FIG. 20, there three of the tool grippers associated with each of the vertical sides 431 and 432 of the rack whereby a single rack in the embodiment shown can hold six tools. It is within the contemplation of the invention to have a greater or lesser number of grippers on each rack and to vary the spacing therebetween as may be required with the size of the cutting portion of the tool. For example, if big diameter milling cutters are used it may be necessary to have more space between grippers in order to prevent interference between the tools.

One of the tool grippers is shown in section in FIG. 21 where, in detail, it will be seen that the fingers 433 and 434 are pivoted to the rack by pins 438 and 439, respectively, and the notch formed in the rack and indicated at 440 has a rib 440a to fit within the tool handling groove 437 of the tool.

Figure 15:
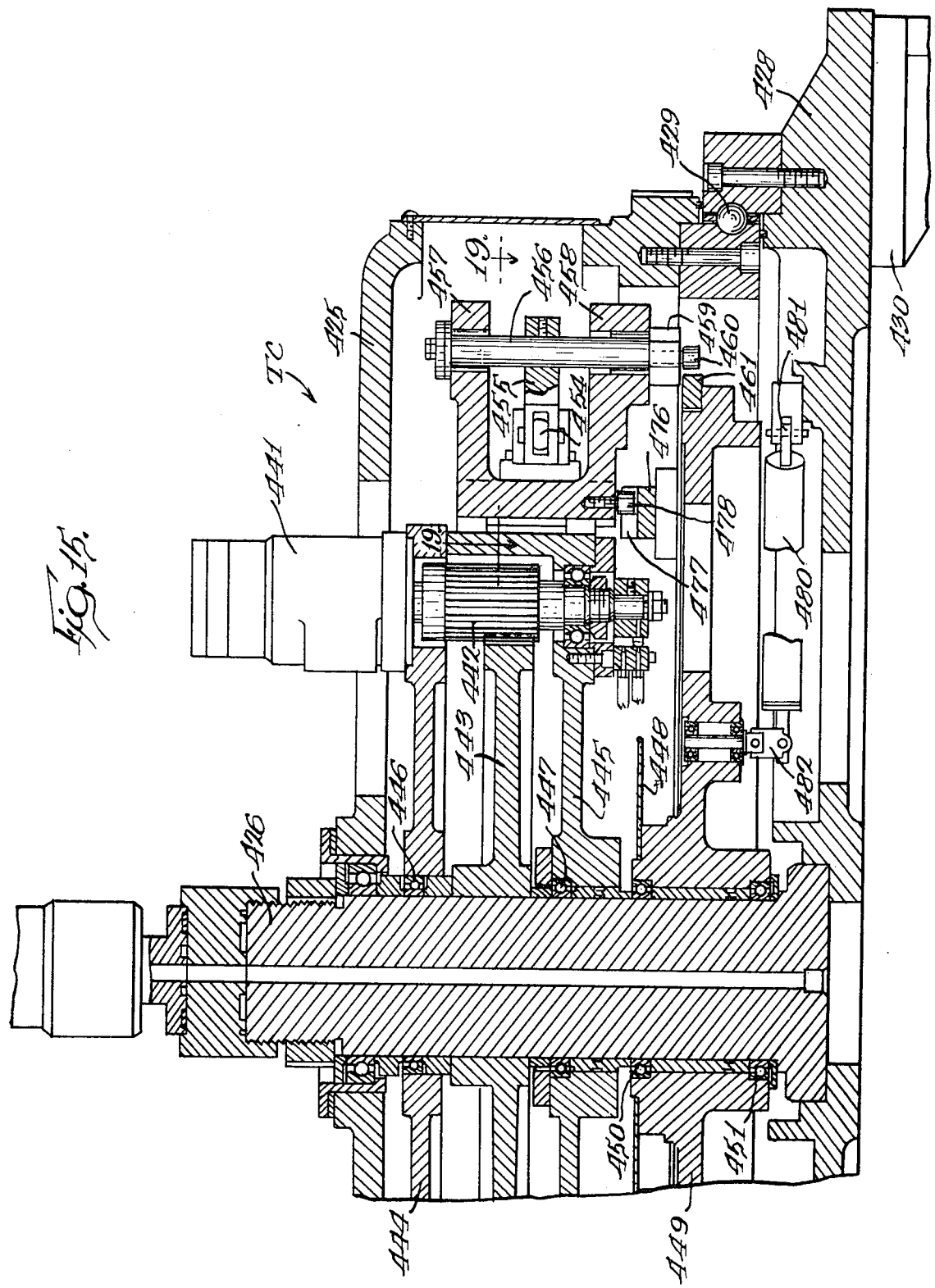
FIG. 15 is a view, similar to FIG. 14, showing the remainder of the drive mechanism for the tool changer.
Figure 16:
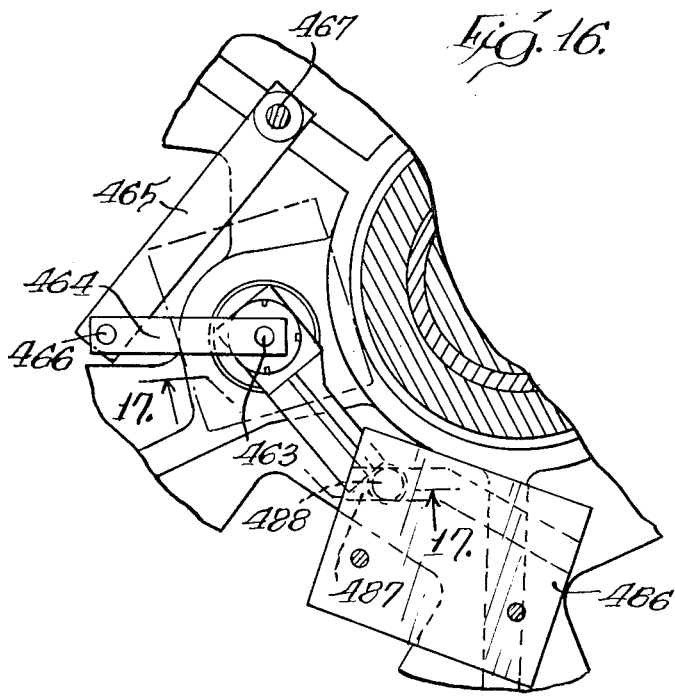
FIG. 16 is a fragmentary plan section, taken generally along the line 16—16 in FIG. 14.
Figure 18:
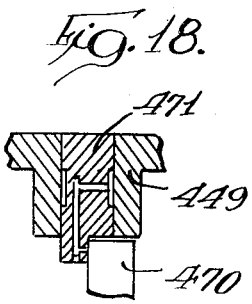
FIG. 18 is a fragmentary vertical section taken generally along the line 18—18 in FIG. 14.
Figure 17:
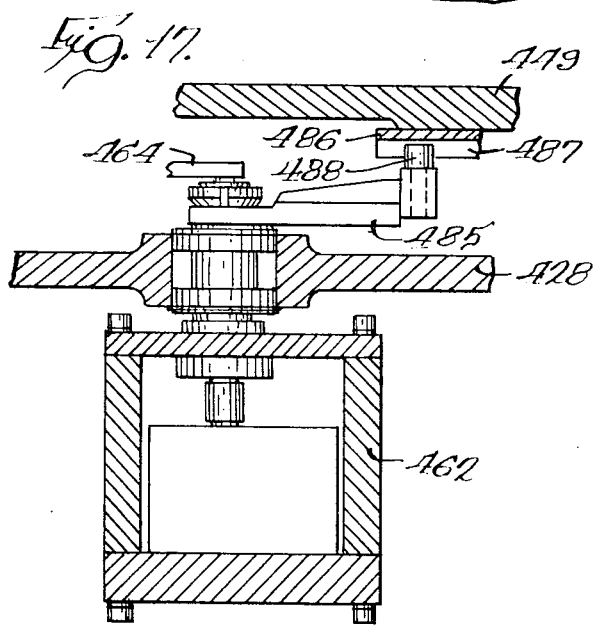
FIG. 17 is a fragmentary section, taken generally along the line 17—17 in FIG. 16.
Figure 19:
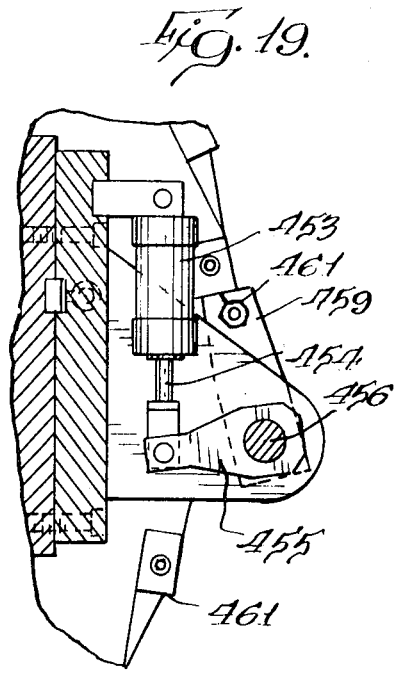
FIG. 19 is a plan section, taken generally along the line 19—19 in FIG. 15.
Figure 23:
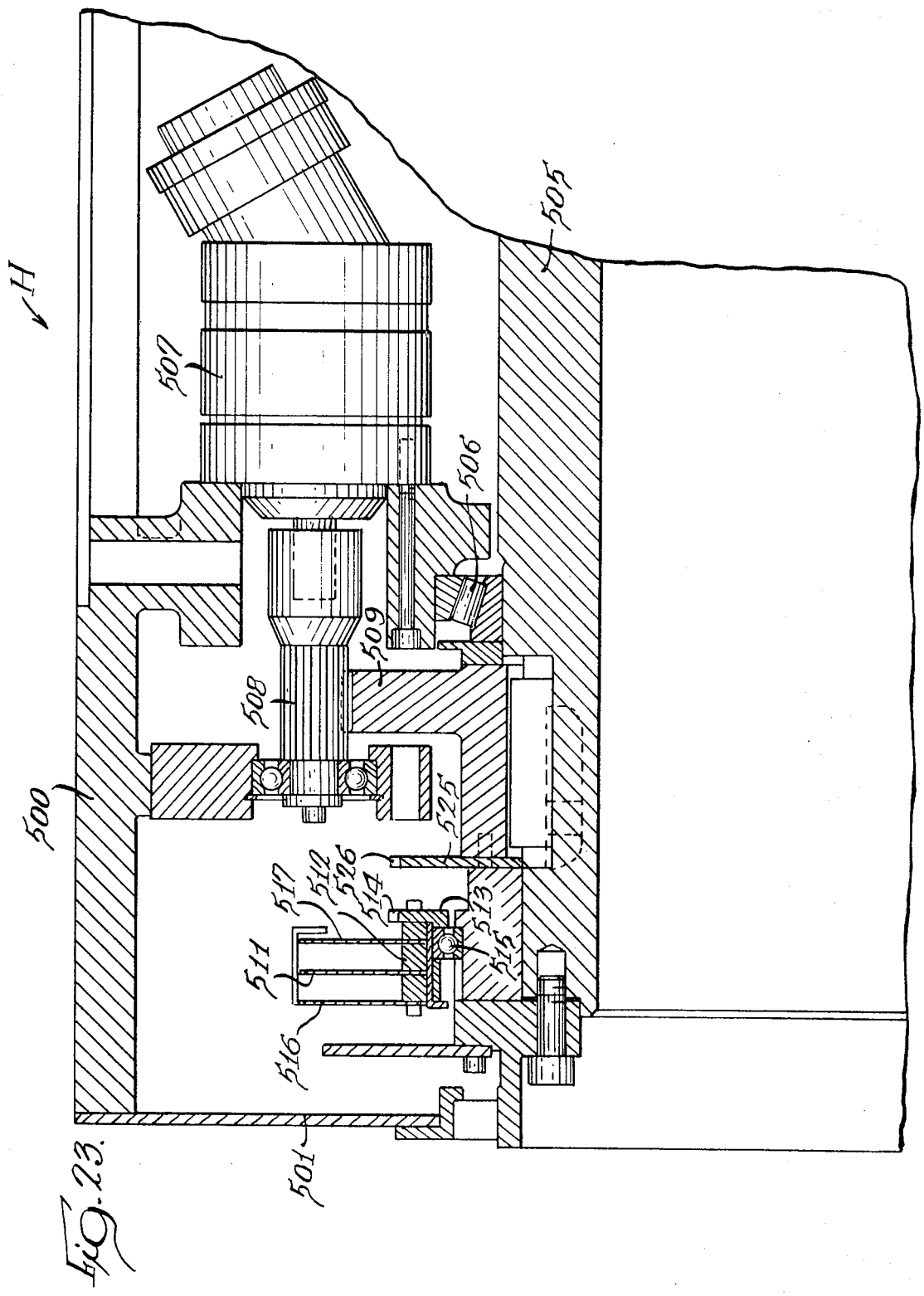
FIG. 23 is a fragmentary vertical section, taken generally along the line 23—23 in FIG. 22.

The indexable drum 428 is rotatably positioned under suitable numerical control to present a vertical row of tool grippers which is preselected into alignment with the spindle S for a tool change operation. The selection of a particular gripper location in a vertical row is selected by the vertical positioning of the spindle head SH. The rotatable positioning of the indexable drum 428 is derived from the controlled operation of a low-speed, high torque fluid motor 441 (FIG. 15) having an output shaft with a drive gear 442 engageable with a gear 443 fixed to the shaft 426. The motor 441 is mounted on a frame having interconnected upper and lower plates, with the upper plate 444 mounting the motor 441 and spaced from the lower plate 445. These plates are positioned within the casing 425 and are mounted for rotation relative to the shaft 426 by bearings 446 and 447. With the motor and its support plate 444 held fixed to the casing 425 by means to be described, resulting rotation of the motor driven gear 442 rotates the shaft 426 to rotate the indexable drum 428. The drum 428 is stopped in desired position by first slowing down and then stopping the drive by means of a system including a disc 448 fixed to a plate 449 rotatably mounted on the shaft 426 by bearings 450 and 451. The disc 448 is provided with coded openings spatially related to the vertical series of grippers on the tool drum racks 430 and the coding is read by a pneumatic reader 452. The reading of the preselected code on the disc 448 results in stopping of the disc and resulting slow-down of the indexable drum 428 followed by stopping thereof. The reading of the desired code causes operation of a cylinder 453 (FIG. 19) fastened to the upper and lower plate structure, 444, 445, mounting the motor 441 and extension of the cylinder rod 454 thereof to pivot an operating arm 455 fastened to a pivot pin 456 mounted in ears 457 and 458 (FIG. 15) extending from the aforesaid plate structure. A stop arm 459 fixed to the lower end of pin 456 carries a roller 460 which moves into engagement with a notch 461 on the periphery of the disc-carrying plate 449. There are as many notches 461 about the periphery of the plate 449 as there are vertical rows of tool grippers and with the notches being in circumferentially spaced alignment with the vertical rows of tool grippers when the tool drum 428 is locked. Stoppage of the plate 449 does not stop the indexing drum 428, since the motor 441 is still operating to rotate the drum. This does cause relative movement between these two parts and operation of a valve 462 carried by and positioned beneath the index drum plate 428. This valve is in circuit with the fluid motor 441 and operates to reduce the fluid flow to the motor followed by stoppage of the flow to stop the motor. The valve is operated by a stem 463 extending upwardly therefrom connected to an arm 464 which is pivotally connected to an arm 465 by a pin 466 (FIG. 16). An end of the arm 465 is pivotally connected by a pin 466 to the underside of the disc-carrying plate 449. The continued movement of the indexable drum 428 at a gradually reducing rate under the control of the valve 462 continues until an upstanding abutment 470 on the drum 428 engages a downwardly-depending stop surface 471 (FIG. 14) on the disc-carrying plate 449. This physically locates the indexable drum 428 in a position to locate a vertical row of grippers in line with the spindle S.

Assuming that a tool T carried in a gripper is to be inserted in the spindle S, the spindle is located vertically with the tool and then moved axially of the tool to receive the shank of the tool or an adapter associated therewith. The indexable drum 428 is then stepped a short distance in either a clockwise or counterclockwise direction, depending upon the direction of movement required to free the tool T from the tool holding fingers 433 and 434. This operation is performed by a double-acting cylinder 475 (FIG. 1) connected to a bar 476 (FIG. 15) having a notch 477 receiving a pin 478 extending downwardly from the motor mounting plate 445 (FIG. 15). The motor mounting plates 444 and 445 are rotatably mounted on the shaft 426, as previously mentioned, and it is the mechanism just described which holds these plates against rotation and with the casing 425 except for the slight rotation induced by movement of the cylinder 475 to remove a tool from a gripper.

When the tool is to be removed from the spindle, the tool changer TC is brought back into position and the spindle brought to the proper elevation and the cylinder 475 is then operated to rotate the drum 428 and insert the tool back into the gripper from which it originally came. The tool changer TC is then moved away from the spindle and is sequenced through a cycle to bring the next vertical row of grippers into alignment with the spindle, followed by advancement of the tool changer into close proximity to the spindle for insertion of the next tool into the spindle. The next cycle for bringing the next tool into position for insertion in the spindle requires a further search and rotation of the tool indexing drum 428 unless the next tool is in the same vertical row. This rotational search is initiated by operation of the cylinder 453 to release the stop 459 and roller 460 thereof from the catch 461. At this time, the valve 446 is still closed, so that there is no supply of fluid to the motor 441. A cylinder and spring unit 480 (FIG. 15) is connected between the indexable drum by a pivotal connection 481 and the disc-carrying plate 449 by a pivotal connection 482 and the spring contained therein causes advancement of the disc-carrying plate 449 relative to the drum 428 to extend the arm linkage, including arms 464 and 465 connected to the valve stem. This extension results in rotation of the stem to gradually open the valve 462 and accelerate the motor and the indexable drum 428. This moves the abutments 470 and 471 away from each other in position to again come together on the next succeeding stop cycle of the tool changer. On the next succeeding stop cycle, of course, the relative movement will again stress the spring within the cylinder 480 to be effective to separate the parts when the tool change cycle starts.

In the event that it is desired to vary the rate of acceleration and deceleration of the motor 441, provision is made for rotatably adjusting the valve housing 462 by means of a cam operated by an arm 485 engageable with a plate 486 having a cam track 487 which is adjustable and coacts with a follower 488 at an end of the arm. The positioning of the plate 486 causes a modification in the action of the valve as controlled by the stem 463 to vary the rate of acceleration and deceleration.

With the foregoing radial orientation of tools in the tool changer, the insertion ends of the tools have maximum spacing therebetween to permit entry of the spindle close to the tools without interference and thus maximizes the number of tools that can be held in a given space.

SPINDLE INDEX MECHANISM

This mechanism is sown in FIGS. 22–27 and provides for numerically controlled selected index positioning of the work holder H for desired orientation of the work to be machined. The work holder H has a casing 500 with a rear wall 501. The lower part of the casing 500 is provided with guide structure, indicated generally at 502 and 503 for coaction with the ways 20 and 21 of the machine for movement of the work holder along the work axis. A work spindle 505 is rotatably mounted within the work holder H by spaced bearings, one of which is shown at 506 in FIG. 23 and with another bearing located forwardly thereof. The front end of the work spindle 505 mounts the gripping mechanism shown particularly in FIGS. 10 and 11.

The power for rotatably indexing the work spindle 505 is obtained from a fluid motor 507 having an output shaft with a drive gear 508 meshing with a gear 509 fixed to the work spindle 505. The motor 507 is in fluid circuit with, and under the control of, a valve 510, with the position of the valve controlling the speed rate of the motor 507 and providing acceleration and deceleration in indexing movement of the work spindle 505.

In a machine of the design disclosed herein, the work spindle 505 can have 72 different index positions, with the position being selected by numerical control and determined by a system including a locator disc 511 which is an annular member fixed at its inner perimeter to a base 512. A mounting ring 513 for the base 512 has an annular series of outwardly projecting teeth 514 for a purpose to be described. The mounting ring 513 is rotatably supported on the work spindle 505 by a bearing 515. The locator disc is spaced from two similarly shaped outer plates 516 and 517 and with the locator disc 511 movable between a pair of plates of a reading mechanism, indicated generally at 518. The locator disc 511 has a radially aligned series of areas provided with openings or solid areas which can be read through the pneumatic reading unit 518 which reads a binary code depending upon the pattern of openings in the locator disc.

Figure 24:
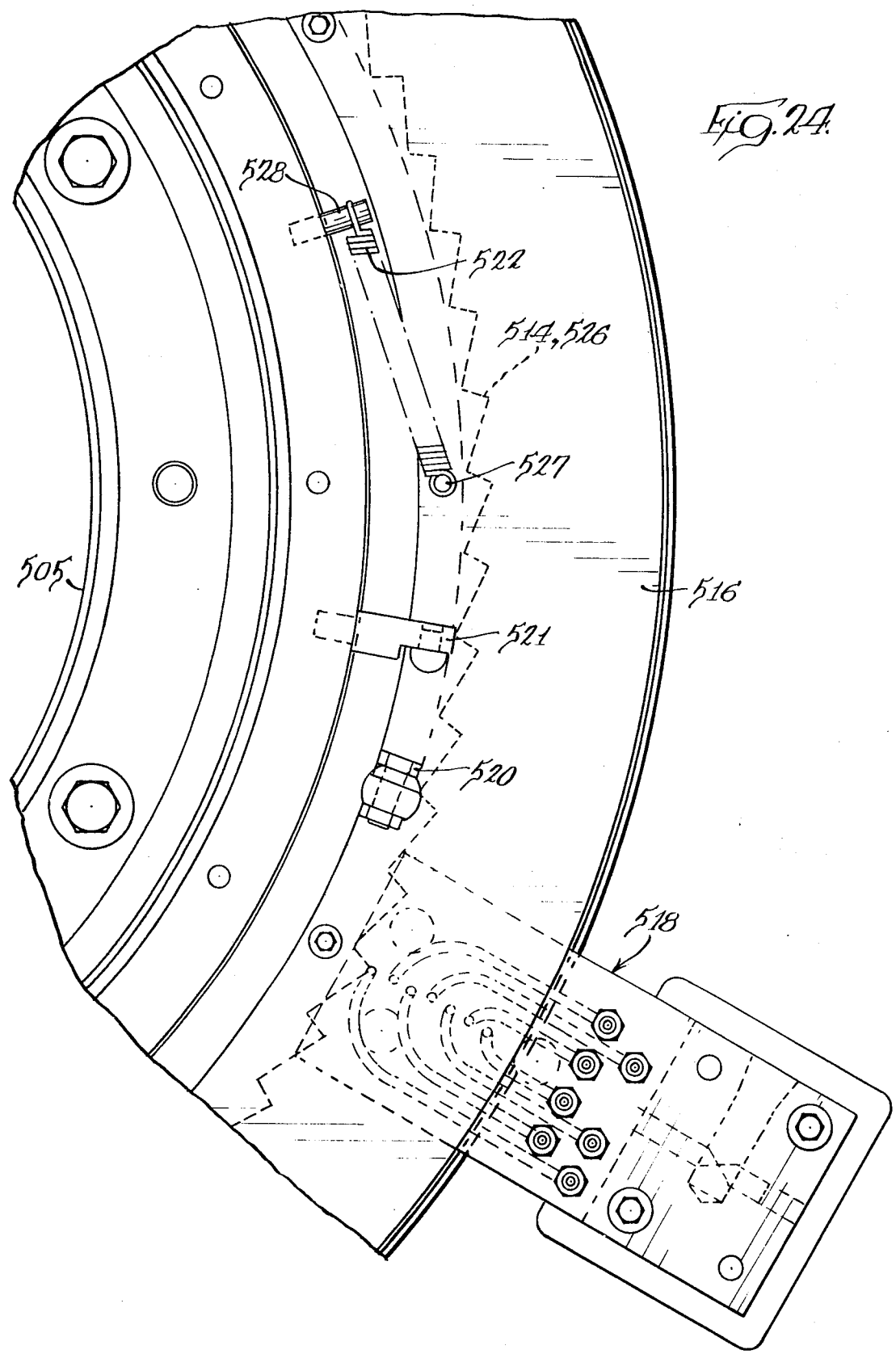
FIG. 24 is a plan view, on an enlarged scale, of the reading mechanism and locator disc and associated structure for obtaining an index position of the work holder.

The relationship of several of the parts is shown in FIGS. 24–26 with the work spindle 505 locked in a selected position and with a pair of abutment members 520 and 521 (FIG. 24) shown in spaced relation and with a spring 522 under tension. The abutment 520 is carried by the mounting ring 513 for the locator disc 511 and the abutment 521 is carried by a disc 525 fixed to the work spindle 505 and having a series of teeth 526 about the periphery thereof. The spring 522 is connected between a pin 527 on the mounting ring 513 for the locator disc and a pin 528 extending outwardly from the work spindle 505.

In a search operation for the next indexed position of the work spindle 505, the restraint of the locator disc 511 and the toothed disc 525, by mechanism to be described, is released. The spring 522 has sufficient force to rotate the locator disc 511 and its associated structure in a counterclockwise direction, as viewed in FIG. 24, to bring the abutments 520 and 521 into engagement. With this engagement, the teeth 514 and 526 are in alignment.

When the reading unit 518 reads the prescribed coding on the locator disc 511, the circuit associated therewith causes operation of a cylinder 530 (FIG. 25), mounted on a bracket 529 secured to the casing 500. The cylinder 530 has a rod 531 extending therefrom which is threaded into a block 532 which is pinned by a pin 533 to an arm 534 having a slot 535 therein to movably receive the pin 533. The arm 534 is pivoted to the bracket 529 by a bolt 536 and the arm carries a pawl 537 at the lower end thereof. This pawl coacts with the teeth 514 on the disc mounting ring 513 whereby energization of the cylinder 530 extends the pawl 537 outwardly to engage a tooth 514 and stop the locator disc 511. A second arm 540 moves back and forth with the arm 534 through connection by the pin 533 so that as the pawl 537 is extended to engage a tooth 514, a pawl 541 is extended to engage a tooth 526 on the annular disc 525. At the time of this initial engagement, the pawls 537 and 541 are at the same level and engage teeth 514 and 526, respectively, at the same time. The pawl 537 cannot move and therefore locks the associated tooth because of the fixed pivot at 536. However, the pawl 541 and its arm 540 can move upwardly as permitted by fitting of the connecting pin 533 into a vertically elongate slot 542 in the arm 540. The upper end of the arm 540 is pivoted at 543 to a lever arm 544 which, at its opposite end, is pivoted to the casing 500 at 545. A button 546 intermediate the ends of the lever arm is in alignment with a stem 547 of the valve 510. Again, with the pawls 537 and 541 at the same level and operation of the cylinder 530, the pawl 537 moves into locking relation with one of the teeth 514, while the pawl 541 moves into engagement with one of the teeth 526. At this time, the lever arm 544 is lowered from the position shown in FIG. 25 so that the valve stem 547 is not contacted. Thus, the work spindle 505 continues to rotate and carries the annular disc 525 therewith to elevate the pawl 541 and cause clockwise pivoting of the lever arm 544, as viewed in FIG. 25. This brings the button 546 into contact with the stem 547 of the valve to gradually close the valve and reduce flow to the motor 507 and thus reduce the speed of rotation of the work spindle 505. The parts are mounted and arranged whereby as the annular disc 525 has rotated a distance approximately equal to the spacing between adjacent teeth, the stem 547 of the valve will have been shifted sufficiently to close the valve 510 and stop operation of the motor 507. At this time, lever arm 544 engages a follower roller 550 on a stem 551 of a pilot valve 552 which is in circuit with a fluid cylinder 555 shown in FIG. 27 in association with mechanism for locking the work spindle 505 in position.

Figure 27:
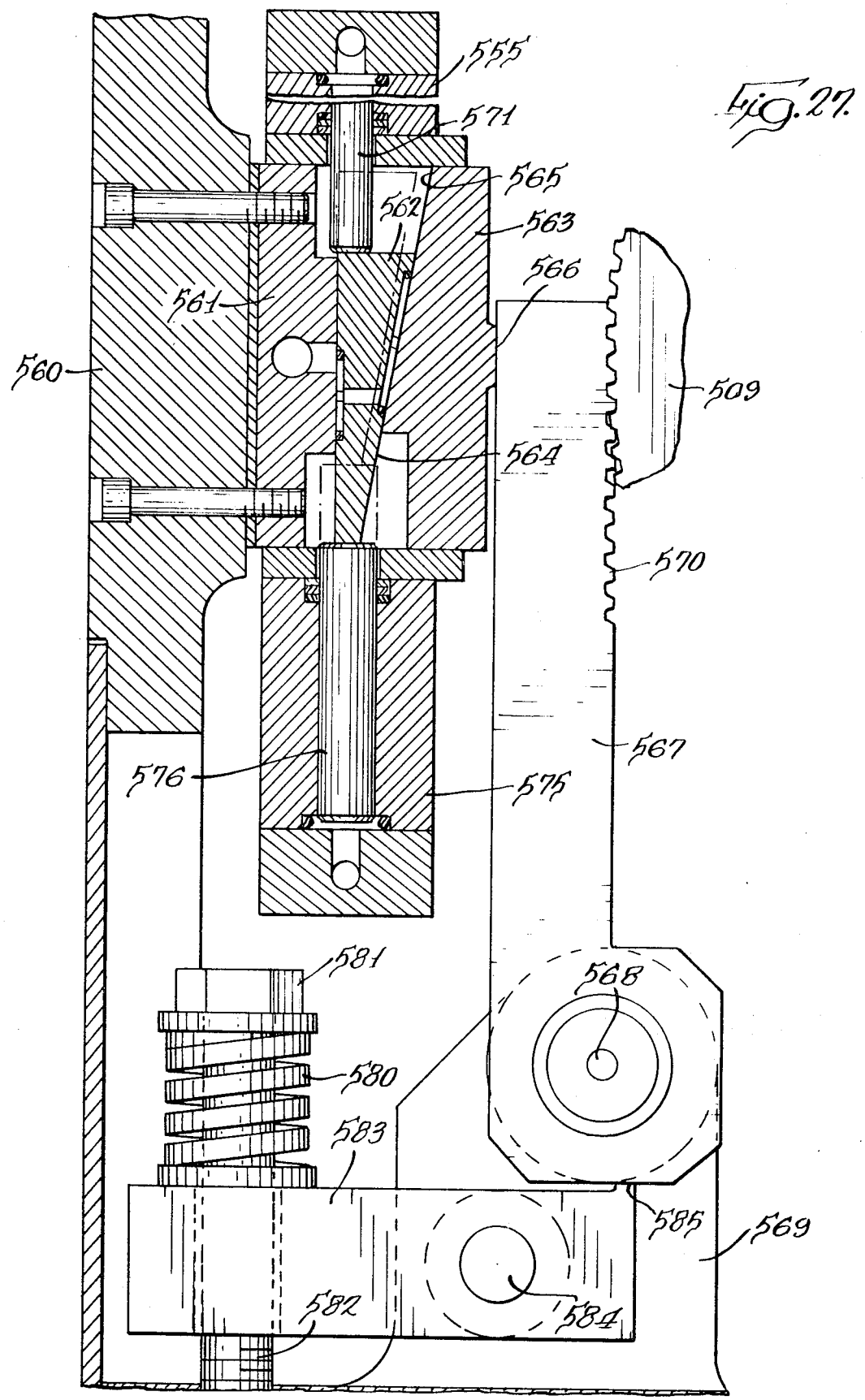
FIG. 27 is an elevational view of the structure shown at the lower left of FIG. 22 and with parts in section.
Figure 28:
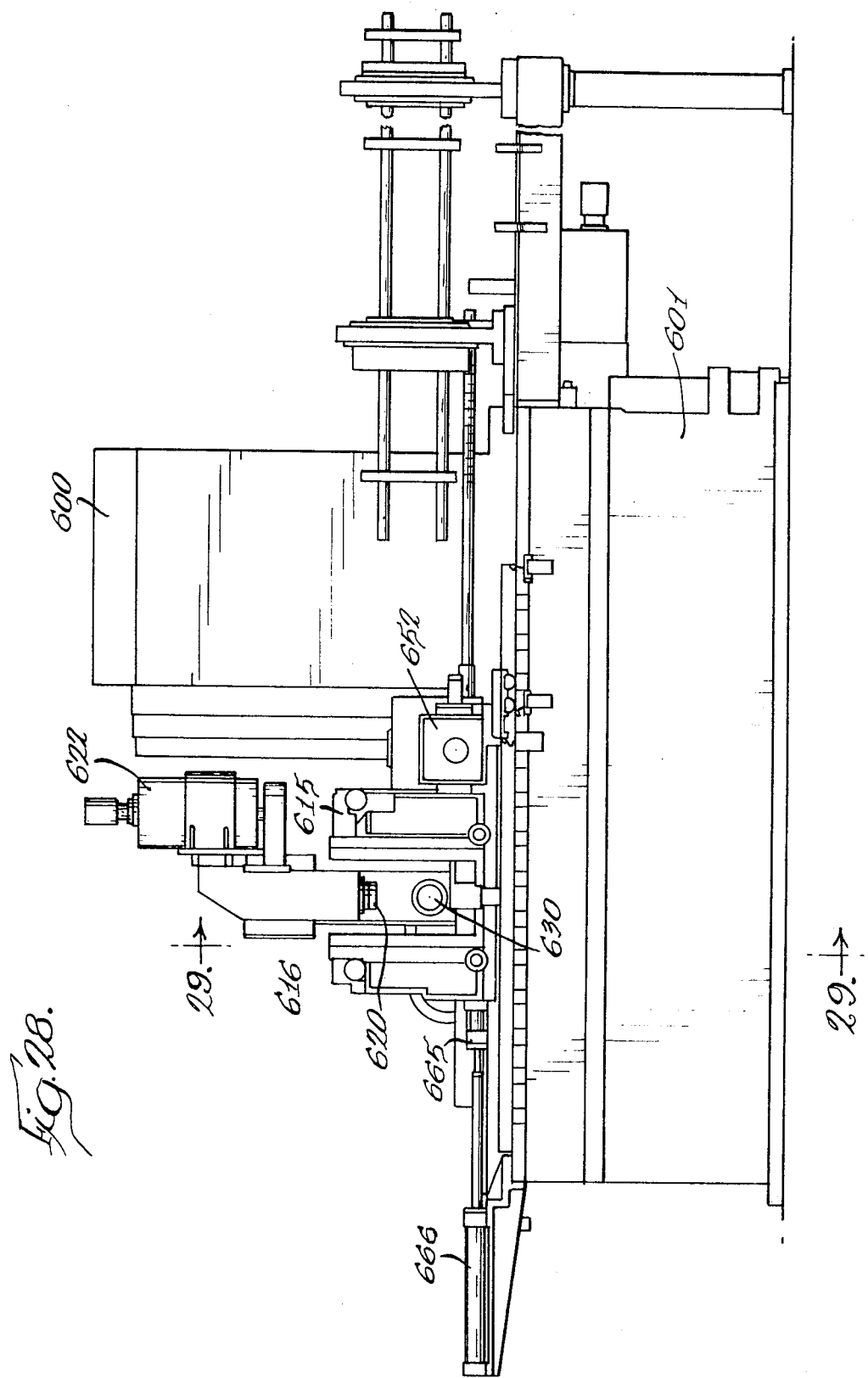
FIG. 28 is a front elevational view of a second embodiment of the invention, with parts broken away.
Figure 29:
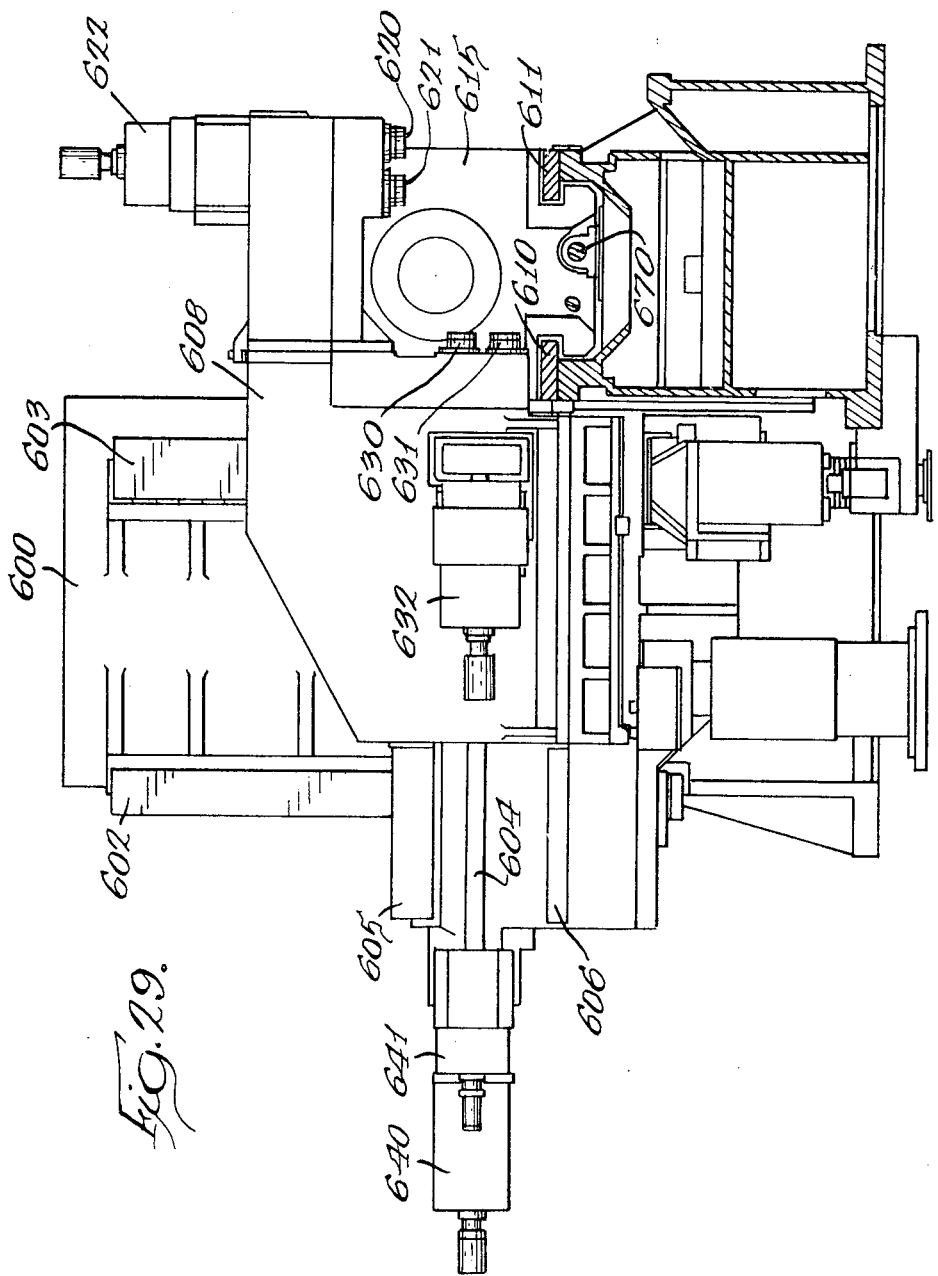
FIG. 29 is a vertical section, taken generally along the line 29—29 in FIG. 28.
Figure 30:
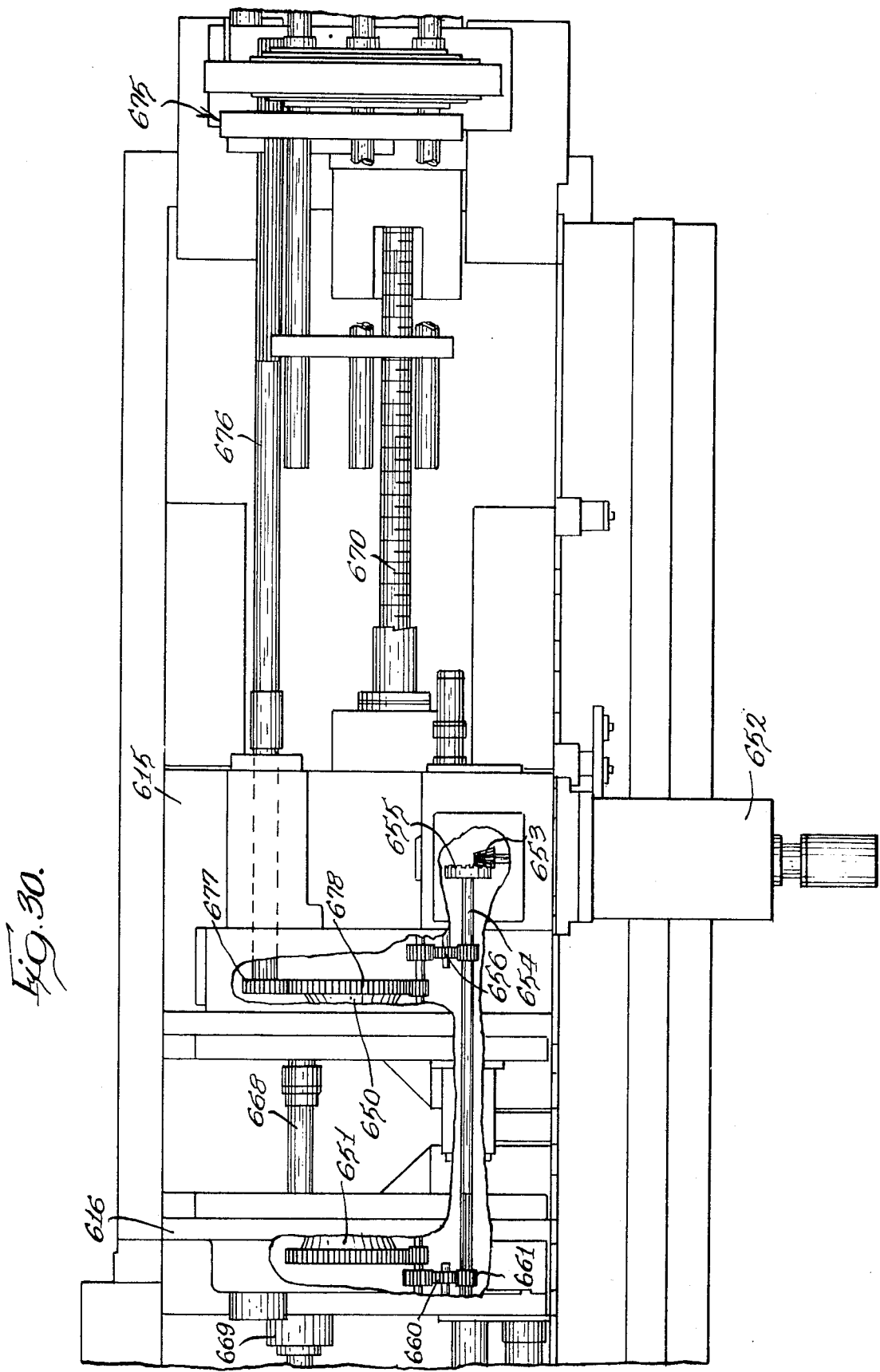
FIG. 30 is an enlarged plan view of a portion of the mechanism shown in FIG. 28 and showing, in particular, the drive for the work holders.
Figure 31:
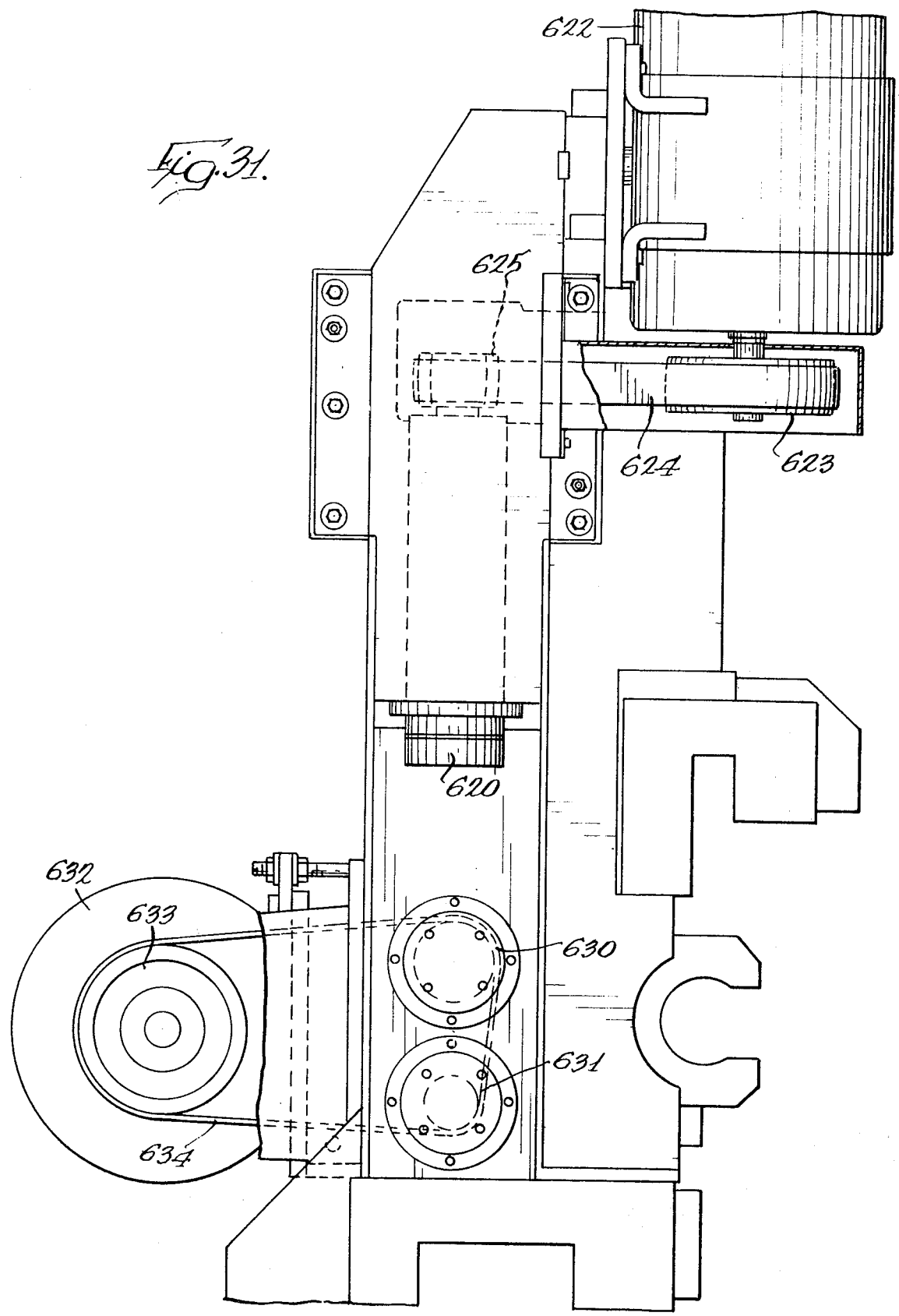
FIG. 31 is a front elevational view of the multispindle head shown in FIG. 28 on an enlarged scale and with parts broken away.

As shown in FIG. 27, the side wall 560 of the casing 500 mounts a holder 561 carrying a pair of wedge blocks 562 and 563 having coacting respective inclined surfaces 564 and 565. An exposed section 566 of the wedge block 563 engages the back side of a lock arm 567 pivoted at 568 on a base member 569. The lock arm 567 has a series of gear teeth 570 extending along the upper length thereof shaped correspondingly to the gear teeth on the driven gear 509 for the work spindle 505. On energization of the fluid cylinder 505, a plunger 571 positioned therein has a lower end engageable with the wedge block 562 to depress this block and through interengagement of inclined surfaces 564 and 565 urge the wedge block 563 outwardly and bring the teeth 570 on the lock arm 567 into engagement with the teeth on the gear 509 which positively locks the work spindle 505 in a preselected position. Release of pressure from the cylinder 555 simultaneously with the exertion of pressure in a lower cylinder 575 which acts on a pin 576 elevates the wedge block 562 engageable by the pin 576 to permit retraction of the wedge block 563. This retraction is powered from forces normally urging the lock arm 567 to the position shown in FIG. 27 and out of engagement with the gear 509. Specifically, this mechanism includes a spring 580 captured between the head 581 of a bolt 582 and acting on an arm 583 pivoted at 584 to the base member 569 and having a surface 585 at its end thereof engageable with the lower end of the lock arm 567 at a point to provide rotational forces urging the lock arm 567 away from the gear 509.

The foregoing description has described the structure and the sequence of operation for locating and locking the work spindle 505 in a preselected index position. When it is desired to index the bar stock to a different position, the lock arm 567 is released from the gear 509 and the cylinder 530 actuated to retract the stem 531 which releases the pawls 537 and 541 from the teeth 514 and 526, respectively. This permits fall of the arm 540 and the lever arm 544 to gradually open the valve 510 to supply fluid to the motor 507. The motor 507 commences rotation to resultingly drive the work spindle 505 and with this movement accelerating until the valve is fully open. With the parts locked, the relation between the abutments 520 and 521 is as shown in FIG. 24 and upon release for movement to a new index position, the pawl 537 in freeing engagement with the tooth 514 permits the spring 522 to take over and bring the abutments 520 and 521 into engagement.

The term "indexing" as used herein refers to movement of the bar stock about a work axis which can be either inside or outside the envelope of the bar stock.

SECOND EMBODIMENT OF THE INVENTION

In the embodiment disclosed in FIGS. 28–31, a column 600 extends upwardly alongside a bed 601 with the column having ways 602 and 603 which support a saddle 604 having ways 605 and 606 which movably mount a multispindle head 608 for movement along an axis transverse to the axis of movement of the saddle 604. The bed has ways 610 and 611 extending parallel to a work axis which movably mount a pair of work holders 615 and 616, each of which have central openings provided with gripper structure facing each other and similar to that shown in FIGS. 10 and 11 for releasably gripping the bar stock at both sides of a machining location defined by the tool spindles. The multispindle head 608 has a pair of vertically disposed, spaced, parallel spindles 620 and 621 driven from a motor 622 mounted on the spindle head and having an output shaft with a drive pulley 623 driving a belt 624 passing about a pulley associated one with each of the spindles and with a pulley 625 shown in FIG. 31 engaged by the belt for driving the spindle 620.

A second pair of spaced parallel spindles 630 and 631 extend horizontally at right angles to the spindles 620 and 621 and are each driven from a motor 632 carried on the spindle head and having an output shaft with a drive pulley 633 driving a belt 634 passing about pulleys on the shafts of spindles 630 and 631.

The saddle 604 carries lead screw drive motors 640 and 641 whereby the saddle and the spindle head 608 can be moved along their respective ways to position a desired spindle and tool carried thereby in oriented relation with the work axis along which the bar stock extends and to perform the desired machining. With the multispindles, it is possible to use sequentially a plurality of different tools without the requirement for a tool changer, and without the down time required for tool change.

This embodiment is particularly adaptable for contouring wherein the work holders 615 and 616 provide for rotation of the bar stock rather than indexing positioning thereof. In this instance, the work spindles 650 and 651 for the respective work holders and comparable to the work spindle 505 of the previous embodiment, are directly rotated from a motor 652 carried on the work holder 615 and having an output shaft with a gear 653 driving a shaft 654 by engaging a gear 655 on the shaft with the work spindle 650 being driven from the shaft 654 through gearing 656.

The work spindle 651 is also driven from the shaft 654 through gears 660 carried by the work holder 616 and meshing with a gear 661 which is splined to the shaft 654 and can move therealong as the work holder 616 is positioned at various distances from the work holder 615.

The work holder 616 has a zero position along ways 610 and 611, as determined by abutment structure 665 (FIG. 28) positionable by a fluid cylinder 666 on the bed 601. The work holder 616 is not independently powered along the ways 610 and 611 and derives its movement from connection with the work holder 615. This is accomplished by the use of a binder rod 688 (FIG. 30) connected to the work holder 615 and extending through the work holder 616 and a hydraulically actuated binder 669 on work holder 616 which can clamp onto the binder rod 668 and, therefore, lock the work holder 616 to the work holder 615. The work holder 615 is moved along the ways of a motor driven ball screw 670 mounted on the base and engageable with the work holder.

A rotatable cage structure, indicated generally at 675, is driven from the motor 652 through a shaft 676 having a gear 677 engaging with the perimeter gear 678 on the work spindle 650. In this manner, the support for the bar stock having substantial length can rotate at the same speed as the work spindles in the work holders.

In this embodiment, the work holder 616, through the binder 669, is connected to the work holder 615 and the latter can move the work holder 616 against the locating abutment 665. The binder 669 is then released and the work holder 615 moved away therefrom to a prescribed point.

In initially loading bar stock, the work holder 616 can be moved to the position against abutment 665 with the bar stock gripper jaws in the holder closed and the work can then be inserted through work holder 615 until it contacts the closed jaws. The work holder 615 is then positioned at a prescribed point and the binder 669 is then locked and the work holders grip the bar stock and move together during a machining operation. After completion of machining an initial part, the work holders are a prescribed distance apart with the leading edge of the new part exposed from the work holder 615. The work holder 615 can be located at a prescribed position to, in effect, locate the holder 616 and then the binder 669 is released as well as the gripping jaws of the holder 616 to then permit the holder 615 to move towards the holder 616 to advance the part into the holder 616. The grippers in 616 are then closed and those in 615 are opened to permit movement of the holder 615 away a distance to provide a length of exposed bar stock for machining and then the grippers in holder 615 are closed and the binder 669 is again set whereby the holders can move together firmly gripping the bar stock during machining thereof.

THIRD EMBODIMENT OF THE INVENTION

The embodiment shown in FIGS. 32 and 33 provides for a variation in structure for handling of the bar stock and includes three separate work holders, with the first two of these work holders 750 and 751 being generally similar to the work holders disclosed in the embodiment of FIGS. 28–31.

In this embodiment, the work holders 750, 751 and 752 are mounted on a bed 753 for movement along ways 754 and 755 at the top of the bed.

A motor 760, carried by the work holder 750, drives a shaft 761 which, through gearing, drives work spindles 762 and 763 of the work holders 750 and 751, respectively, and through a shaft 764 deriving rotation from the work spindle 763 and extending to the work spindle 765 of the work holder 752 causes rotation of the latter work spindle. Again, the drive connections for the work spindles 763 and 765 include gears 766 and 767 splined to the shafts 761 and 764, respectively, whereby there can be movement along the drive shafts. A continuation of the shaft 764 drives a rotatable work supporting cage, indicated generally at 770, at one end of the bed and a take-off shaft 771 drives a rotatable work supporting cage indicated generally at 772 at the other end of the bed. Each of the work holders 750, 751 and 752 have their work spindles provided with work gripping jaws, as shown in FIGS. 10 and 11, with the work holders 750 and 751 engaging the work at both sides of the machining station to provide rigid support of the bar stock and rotation of the bar stock as required during machining operation. The work holder 752 functions primarily as a stock feeder and additional strength support for the bar stock to relieve loading on the jaws of the work holder 751. In this embodiment, a motor driven ball screw 800 drives the work holder 752. The work holder 750 is positioned by a fluid cylinder 780 carried on the bed 753 and having a rod 781 connected to the work holder 750. The work holder 751 is positioned by a cylinder 782 mounted on the bed 753 and having a rod 783 extended to a connection point 784, with the work holder 751.

A binder rod 790 connected to the work holder 750 extends through a hydraulically actuated binder 791 carried by the work holder 751 and extends to and through the stock feeding work holder 752 and a binder 792 carried thereon. There is an additional binder rod 795 extending from the opposite side of the work holder 750 which movably fits into a hydraulically actuated binder 796 carried on the bed 753.

With this construction disclosed herein, it is possible to locate the work holder 750 in a desired position by operation of the cylinder 780 and then hold that position by clamping of the binder rod 795 by the binder 796. The part can then be advanced through the work holders 752 and 751 into engagement with the closed jaws in the work holder 750 and, after the work is thus located in position, the work gripping jaws in the stock feeding holder 752 can be closed and those of the work holder 750 opened; while those in the holder 751 are still open to advance a leading part of the work into the work holder 750 and then the jaws of the latter work holder can be closed. The work holder 751 can be positioned by its positioning cylinder 782 at a prescribed distance along the bar stock and when this is accomplished the work gripping jaws thereof can be closed. With the various work holders then properly positioned, the binders 791 and 792 can be locked to cause the work holders 750 and 751 to move simultaneously with the work holder 752 after the binder 796 for the work holder 750 has been unlocked and cylinders 780 and 782 have been neutralized.

With the constructions disclosed herein, long, somewhat flexible parts can be readily handled and advanced to feeding position and the continued advance of successive lengths of bar stock for multiple cuts on the same piece or successive parts is readily obtained through the sequence of operation provided by the positioning cylinders 780 and 782 and the interlocked relation of the work holders through the binder rod 790. The ball screw 800 is driven by a motor, not shown, and provides accurate feed movement of the bar stock along the work axis by controlled movement of the work holder 752 and interconnection thereof to the other two work holders 750 and 751 through the binder rod 790. When the movement is derived from the ball screw 800, the positioning cylinders 780 and 782 are neutralized and the binder 796 is inactive.

In the second and third embodiments, the bar stock can be supported by work holders at each end of a work zone where the tool in the tool spindle may engage a length of the material and wherein both ends of the work zone are not the ends of the bar stock. Additionally, versatility is provided in these embodiments wherein successive work zones may overlap. Also, a section of bar stock previously in a work zone can be returned to a work zone or returned to a different part of a work zone. A part can be cut off from the raw bar stock and still be supported in one work holder.

In both the second and third embodiments, the work holders 616 and 750, respectively, can grip a section of the bar stock material which has been machined in the work zone. In the claims, reference is made to work holders engaging bar stock and this is intended to include bar stock material which may have previously been machined in the work zone. The gripper jaws carried by the work holders 616 and 750 will be shaped appropriately to the contour of the bar stock to be gripped.

The rotation of the work holders in the second and third embodiments at a sufficient rate of speed provides turning capability.

I claim:

1. A machine tool for machining successive parts from bar stock extending lengthwise along a work axis comprising, a tool spindle for carrying a tool, means mounting said spindle for movement along a first axis extending toward the work axis and a second axis at an angle to the first axis, the plane defined by the first and second axes being at an angle to said work axis, a work holder through which the bar stock extends along the work axis and including means for releasably gripping the bar stock, means for moving said work holder and bar stock along said work axis during machining with said bar stock having a portion of its length exposed to the tool for machining, and means for advancing said bar stock relative to said work holder to position the next section of continuous stock for machining.

2. A machine tool as defined in claim 1 including means for locating the bar stock in a predetermined position along the work axis, and means for shifting the work holder along the work axis relative to the bar stock to a controlled location to establish a new relation between the bar stock and the work holder.

3. A machine tool as defined in claim 2 wherein said work locating means comprises a work stop movable to a plurality of positions in a plane to align with a desired portion of the bar stock, and means for moving the bar stock to a position of engagement with the work stop.

4. A machine tool as defined in claim 3 wherein said work stop is a locator carried by the tool spindle.

5. A machine tool as defined in claim 1 wherein said work holder includes an annular member, a pair of work gripping jaws within said member with one movable relative to the other, and a plurality of pressure transmitting members urging one jaw toward the other in a direction having both vertical and horizontal components to seat the bar stock in said jaws.

6. In a machine tool as defined in claim 1, a member movably positioned adjacent the tool including two spaced-apart sets of rigidly interconnected jaws to engage and hold the bar stock at both sides of a tool and rigidify the bar stock during machining.

7. A machine tool as defined in claim 1 including gripping means for holding said bar stock at a side of the tool spindle opposite said work holder whereby added support is provided during machining.

8. A machine tool as defined in claim 7 wherein said gripping means is connected to said work holder for movement therewith.

9. A machine tool for machining successive parts from bar stock comprising, a tool spindle for carrying a tool, means mounting said spindle for movement along first and second axes during machining, a bed extending transversely to said tool spindle, a pair of spaced work holders movable along said bed and which support a length of bar stock exposed therebetween and move said bar stock along a work axis of movement extending axially of the bar stock, means mounting said work holders for movement relative to each other along said work axis to vary the spacing therebetween, and means for moving said work holders simultaneously while retaining a predetermined space therebetween.

10. A machine tool as defined in claim 9 including means mounting each of said work holders for rotation about said work axis.

11. A machine tool as defined in claim 9 wherein each of said work holders releasably grip the bar stock, and means including a third member movable along the work axis to advance the bar stock relative to said work holders.

12. In a machine tool for machining successive parts from bar stock extending lengthwise along a work axis comprising, a tool spindle, a work holder through which the bar stock extends along the work axis and with a portion of the bar stock exposed for machining, means for moving said work holder and bar stock about said work axis and along said work axis, and a vise means to grip said bar stock at either side of a tool extending from said tool spindle and transfer the strength of the bar stock to the part thereof which is being machined, said vise means including a frame, two sets of coacting grippers on said frame with the sets spaced apart along the work axis a sufficient distance to permit a tool to operate on the bar stock therebetween, means on said frame for moving the gripper into bar stock clamping relation, and means mounting said frame for free movement to permit movement thereof with the bar stock.

13. In a machine tool as defined in claim 12 wherein said vise means additionally delivers a finished part to a specific area and further includes a base, a carrier member movable along said base toward and away from said work axis, means pivotally mounted on said carrier member and movably mounting said frame, power means for moving said carrier member, and power means for pivoting said frame relative to the carrier member.

14. A machine tool for machining successive parts from bar stock extending lengthwise along a work axis comprising, a tool spindle for carrying a tool, means mounting said spindle for movement along a first axis extending toward the work axis and a second axis at an angle to the first axis, the plane defined by the first and second axes being at an angle to said work axis, a work holder through which the bar stock extends along the work axis to be positioned in a work zone for machining by the tool and which includes means for releasably gripping the bar stock, means for moving said bar stock and tool spindle relative to each other during machining with said bar stock having a portion of its length exposed to the tool for machining, and means for advancing said bar stock relative to said work holder to position the next section of continuous stock for machining.

15. A machine tool as defined in claim 14 including means for locating the bar stock in a predetermined position along the work axis, and means for shifting the work holder along the work axis relative to the bar stock to a controlled location to establish a new relation between the bar stock and the work holder.

16. A machine tool as defined in claim 14 including gripping means for holding said bar stock at a side of the tool spindle opposite said work holder whereby added support is provided during machining.

* * * * *